(12) United States Patent
Levit et al.

(10) Patent No.: US 9,761,220 B2
(45) Date of Patent: Sep. 12, 2017

(54) LANGUAGE MODELING BASED ON SPOKEN AND UNSPEAKABLE CORPUSES

(71) Applicant: Microsoft Technology Licensing, LLC, Redmond, WA (US)

(72) Inventors: Michael Levit, San Jose, CA (US); Shuangyu Chang, Fremont, CA (US); Benoit Dumoulin, Palo Alto, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 14/711,447

(22) Filed: May 13, 2015

(65) Prior Publication Data
US 2016/0336006 A1    Nov. 17, 2016

(51) Int. Cl.
| | | |
|---|---|---|
| *G10L 15/06* | (2013.01) | |
| *G10L 15/10* | (2006.01) | |
| *G10L 15/14* | (2006.01) | |
| *G10L 15/18* | (2013.01) | |
| *G10L 15/19* | (2013.01) | |

(52) U.S. Cl.
CPC ........... *G10L 15/063* (2013.01); *G10L 15/10* (2013.01); *G10L 15/14* (2013.01); *G10L 15/18* (2013.01); *G10L 15/19* (2013.01); *G10L 2015/0633* (2013.01); *G10L 2015/0635* (2013.01)

(58) Field of Classification Search
CPC ....... G10L 15/063; G10L 15/10; G10L 15/14; G10L 15/18; G10L 2015/0633; G10L 2015/0635

USPC ......................................................... 704/244
See application file for complete search history.

(56) References Cited

U.S. PATENT DOCUMENTS

| | | | | |
|---|---|---|---|---|
| 8,306,818 | B2 * | 11/2012 | Chelba ................ | G06F 17/2715 704/236 |
| 8,407,041 | B2 * | 3/2013 | Deng .................. | G06F 17/2818 704/2 |
| 8,694,312 | B2 * | 4/2014 | Mathias ................ | G10L 15/063 704/235 |
| 2001/0029453 | A1 * | 10/2001 | Klakow ................ | G10L 15/063 704/257 |

(Continued)

OTHER PUBLICATIONS

PCT International Search Report in PCT/US2016/031690, mailed Jun. 27, 2016, 10 pages.

(Continued)

*Primary Examiner* — Edwin S Leland, III

(57) ABSTRACT

A computer system for language modeling may collect training data from one or more information sources, generate a spoken corpus containing text of transcribed speech, and generate a typed corpus containing typed text. The computer system may derive feature vectors from the spoken corpus, analyze the typed corpus to determine feature vectors representing items of typed text, and generate an unspeakable corpus by filtering the typed corpus to remove each item of typed text represented by a feature vector that is within a similarity threshold of a feature vector derived from the spoken corpus. The computer system may derive feature vectors from the unspeakable corpus and train a classifier to perform discriminative data selection for language modeling based on the feature vectors derived from the spoken corpus and the feature vectors derived from the unspeakable corpus.

20 Claims, 8 Drawing Sheets

(56) References Cited

U.S. PATENT DOCUMENTS

| | | | |
|---|---|---|---|
| 2006/0212288 A1* | 9/2006 | Sethy | G06F 17/2715 |
| | | | 704/10 |
| 2012/0035915 A1* | 2/2012 | Kitade | G10L 15/197 |
| | | | 704/9 |
| 2014/0214419 A1* | 7/2014 | Rao | G10L 15/063 |
| | | | 704/240 |

OTHER PUBLICATIONS

Chen, et al., "Discriminative Training on Language Model", International Conference on Speech and Language Processing, Oct. 2000, 4 pages.

Kuo, et al., "Discriminative Training of Language Models for Speech Recognition", In International Conference on Acoustics Speech and Signal Processing, May 13, 2002, 4 pages.

Roark, et al., "Discriminative n-Gram Language Modelling", In Journal of Computer Speech and Language, vol. 21, Issue 2, Apr. 2007, 30 pages.

Liu, et al., "Discriminative Language Model Adaptation for Mandarin Broadcast Speech Transcription and Translation", In Proceedings of IEEE Automatic Speech Recognition and Understanding, Dec. 9, 2007, 6 pages.

Huang, et al., "Discriminative Training Methods for Language Models using Conditional Entropy Criteria", In Proceedings of the IEEE International Conference on Acoustics, Speech, and Signal Processing, Mar. 14, 2010, 4 pages.

Chelba, et al., "Discriminative Training of N-gram Classifiers for Speech and Text Routing", In Proceedings of Eurospeech Conference, Sep. 2003, 4 pages.

Li, et al., "Leveraging Multiple Query Logs to Improve Language Models for Spoken Query Recognition", In Proceedings of the IEEE International Conference on Acoustics, Speech, and Signal Processing, Apr. 19, 2009, 4 pages.

Mairesse, et al., "Spoken Language Understanding from Unaligned Data Using Discriminative Classification Models", In IEEE International Conference on Acoustics, Speech and Signal Processing, Apr. 19, 2009, 4 pages.

Sak, et al., "Language Model Verbalization for Automatic Speech Recognition", In IEEE International Conference on Acoustics, Speech and Signal Processing, May 26, 2013, 5 pages.

Wang, et al., "Speech Utterance Classification Model Training without Manual Transcriptions", In Proceedings of IEEE International Conference on Acoustics, Speech and Signal Processing, May 14, 2006, 4 pages.

Woodland, et al., "Large Scale Discriminative Training for Speech Recognition", In Proceedings of ISCA Tutorial and Research Workshop on Speech and Emotion, Sep. 2000, 10 pages.

* cited by examiner ns may be accomplished by different examples.
LANGUAGE MODELING BASED ON SPOKEN AND UNSPEAKABLE CORPUSES

BACKGROUND

Speech recognition systems match sounds with word sequences by utilizing a language model to recognize words and phrases from audio input. For example, a language model can be used for assigning probabilities to word sequences and estimating the relative likelihood of possible matching phrases. Training a language model for use in a speech recognition system typically requires large quantities of text so that many possible word sequences are observed in the training data. Transcribed speech is commonly used as training data but is costly to produce and limits the amount of available training data.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computer system for language modeling may collect training data from one or more information sources, generate a spoken corpus containing text of transcribed speech, and generate a typed corpus containing typed text. The computer system may derive feature vectors from the spoken corpus, analyze the typed corpus to determine feature vectors representing items of typed text, and generate an unspeakable corpus by filtering the typed corpus to remove each item of typed text represented by a feature vector that is within a similarity threshold of a feature vector derived from the spoken corpus. The computer system may derive feature vectors from the unspeakable corpus and train a classifier to perform discriminative data selection for language modeling based on the feature vectors derived from the spoken corpus and the feature vectors derived from the unspeakable corpus.

These and other features and advantages will be apparent from a reading of the following detailed description and a review of the appended drawings. It is to be understood that the foregoing summary, the following detailed description and the appended drawings are explanatory only and are not restrictive of various aspects as claimed.

DETAILED DESCRIPTION

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

Figure 1A:
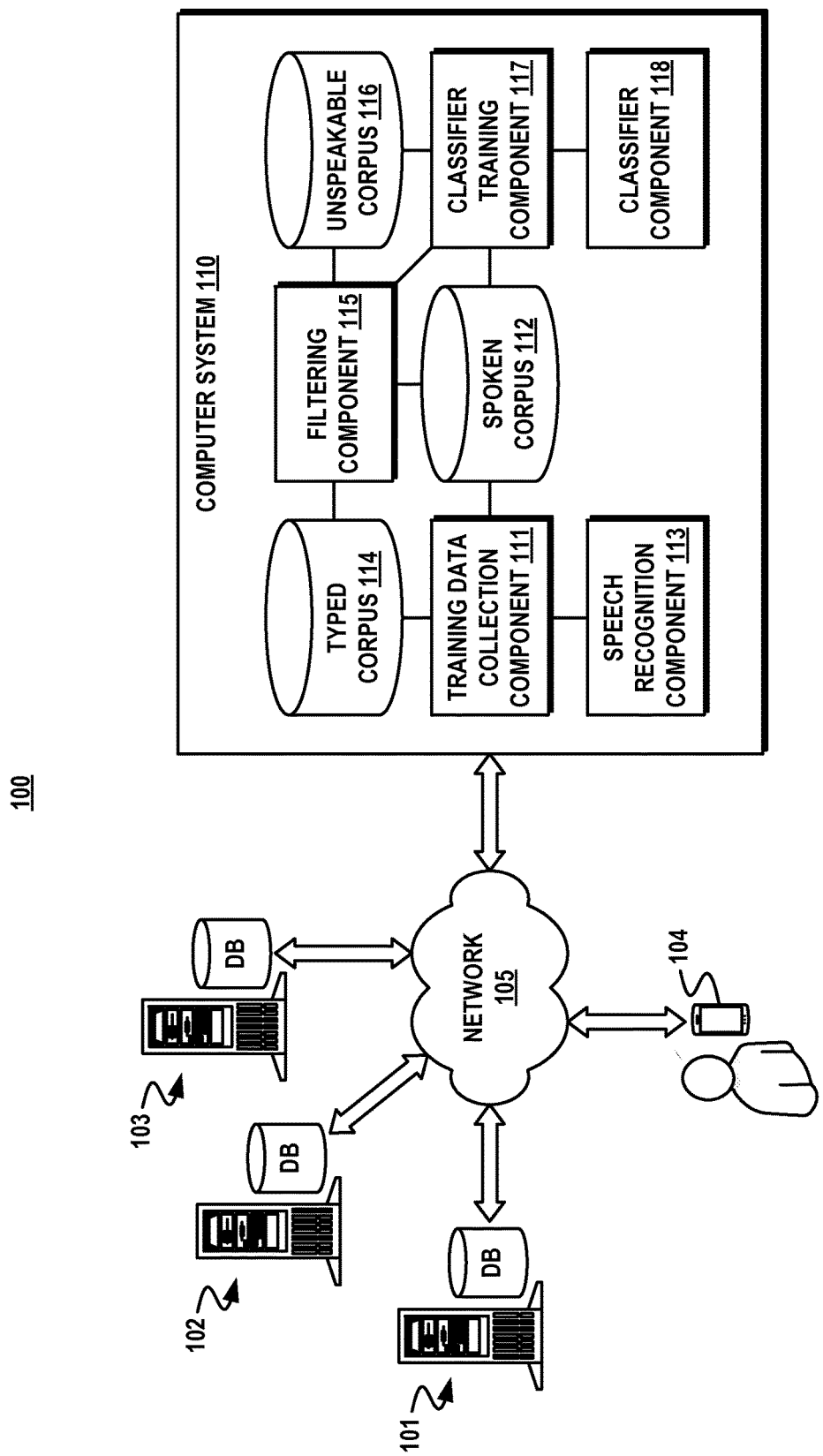
FIGS. 1A and 1B illustrate an operating environment as an embodiment of an exemplary operating environment that may implement aspects of the described subject matter.
Figure 1B:
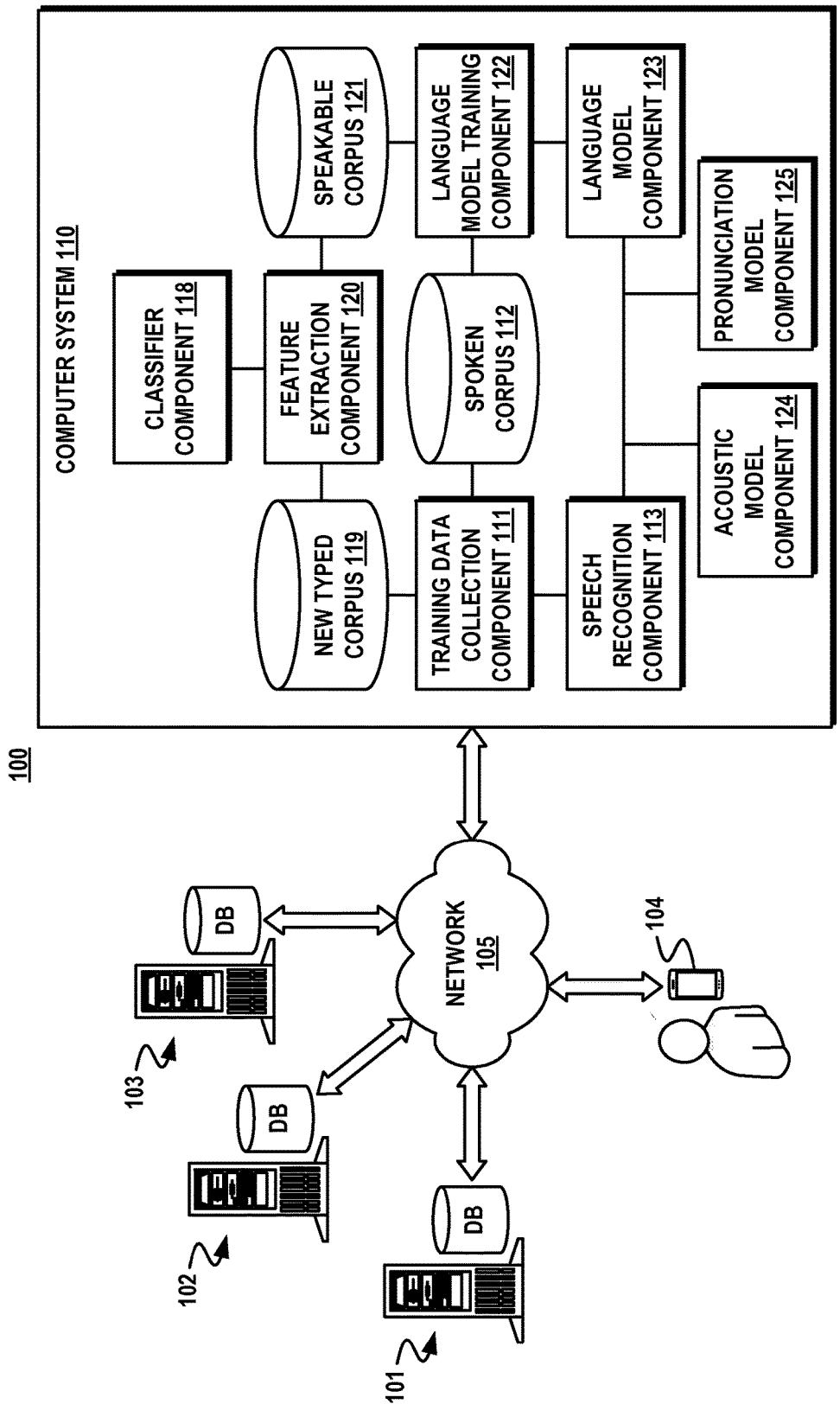

FIGS. 1A and 1B illustrate an operating environment 100 as an embodiment of an exemplary operating environment that may implement aspects of the described subject matter. It is to be appreciated that aspects of the described subject matter may be implemented by various types of operating environments, computer networks, platforms, frameworks, computer architectures, and/or computing devices.

Implementations of operating environment 100 are described in the context of a computing device and/or a computer system configured to perform various steps, methods, and/or functionality in accordance with aspects of the described subject matter. It is to be appreciated that a computer system may be implemented by one or more computing devices. Implementations of operating environment 100 also are described in the context of "computer-executable instructions" that are executed to perform various steps, methods, and/or functionality in accordance with aspects of the described subject matter.

In general, a computing device and/or computer system may include one or more processors and storage devices (e.g., memory and disk drives) as well as various input devices, output devices, communication interfaces, and/or other types of devices. A computing device and/or computer system also may include a combination of hardware and software. It can be appreciated that various types of computer-readable storage media may be part of a computing device and/or computer system. As used herein, the terms "computer-readable storage media" and "computer-readable storage medium" do not mean and unequivocally exclude a propagated signal, a modulated data signal, a carrier wave, or any other type of transitory computer-readable medium. In various implementations, a computing device and/or computer system may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions may be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like. Computer-executable instructions may be stored on one or more computer-readable storage media and may be executed by one or more processors, computing devices, and/or computer systems to perform particular tasks or implement particular data types in accordance with aspects of the described subject matter.

As shown, operating environment 100 includes information sources 101-103 implemented by computing devices such as server computers configured to provide various types of services and/or data stores in accordance with aspects of the described subject matter. In various implementations, information sources 101-103 may be accessed over a network 105 by a computer system 110. Operating environment 100 also includes a client device 104 implemented by a computing device such as a smartphone configured to communicate over network 105 with computer system 110. It is to be understood that information sources 101-103 and client device 104 are provided for purposes of illustration and that operating environment 100 may include a greater or fewer number of information sources and/or client devices.

Network 105 may be implemented by any type of network or combination of networks including, without limitation: a wide area network (WAN) such as the Internet, a local area network (LAN), a Peer-to-Peer (P2P) network, a telephone network, a private network, a public network, a packet network, a circuit-switched network, a wired network, and/or a wireless network. Computer system 110 may communicate via network 105 using various communication protocols (e.g., Internet communication protocols, WAN communication protocols, LAN communications protocols, P2P protocols, telephony protocols, and/or other network communication protocols), various authentication protocols (e.g., Kerberos authentication, NT LAN Manager (NTLM) authentication, Digest authentication, and/or other authentication protocols), and/or various data types (web-based data types, audio data types, video data types, image data types, messaging data types, signaling data types, and/or other data types).

Computer system 110 may be implemented by one or more computing devices such as server computers configured to provide various types of services and/or data stores in accordance with aspects of the described subject matter. Exemplary severs computers may include, without limitation: web servers, front end servers, application servers, database servers (e.g., SQL servers), domain controllers, domain name servers, directory servers, and/or other suitable computers.

Computer system 110 may be implemented as a distributed computing system in which components are located on different computing devices that are connected to each other through network (e.g., wired and/or wireless) and/or other forms of direct and/or indirect connections. Components of computer system 110 may be implemented by software, hardware, firmware or a combination thereof. For example, computer system 110 may include components implemented by computer-executable instructions that are stored on one or more computer-readable storage media and that are executed to perform various steps, methods, and/or functionality in accordance with aspects of the described subject matter.

In some implementations, computer system 110 may provide hosted and/or cloud-based services using redundant and geographically dispersed datacenters with each datacenter including an infrastructure of physical servers. For instance, computer system 110 may be implemented by physical servers of a datacenter that provide shared computing and storage resources and that host virtual machines having various roles for performing different tasks in conjunction with providing cloud-based services. Exemplary virtual machine roles may include, without limitation: web server, front end server, application server, database server (e.g., SQL server), domain controller, domain name server, directory server, and/or other suitable machine roles.

In implementations where user-related data is utilized, providers (e.g., information sources 101-103, client device 104, applications, etc.) and consumers (e.g., computer system 110, web service, cloud-based service, etc.) of such user-related data may employ a variety of mechanisms in the interests of user privacy and information protection. Such mechanisms may include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and/or other suitable mechanisms for protecting user privacy.

Classifier Training

In accordance with aspects of the described subject matter, computer system 110 may perform various operations involved with language modeling to support speech recognition such as classifier training.

Referring to FIG. 1A, computer system 110 may include a training data collection component 111 configured to collect training data from one or more of information sources 101-103. In various embodiments, information sources 101-103 may be implemented by remote information sources such as server-hosted information sources, cloud-based information sources, online information sources, remote data stores, remote databases, remote repositories, web services, web sites, web pages, web content, and/or other types of remote sources of information. Computer system 110 may access and/or communicate with one or more of information sources 101-103 over network 105, and training data collection component 111 may be configured to acquire, extract, receive, and/or otherwise collect text from such one or more information sources 101-103 for use as training data. As mentioned above, computer system 110 and/or training data collection component 111 may employ various mechanisms in the interests of user privacy and information protection when collecting training data from information sources 101-103.

In various implementations, one or more of information sources 101-103 may store text of transcribed speech such as annotated trustworthy in-domain voice transcriptions, transcribed automatic speech recognition system input, automatic speech recognition system output, transcribed audio and/or video teleconferences, transcribed broadcast content, transcribed speeches, transcribed dictations, transcribed spoken search engine queries, and/or other types of automated or human transcriptions of conversational speech or audio content. Training data collection component 111 may acquire, extract, receive, and/or otherwise collect text of transcribed speech from such one or more information sources 101-103 and may generate a spoken corpus 112 containing text of transcribed speech. Spoken corpus 112 may be configured to store textual training data based on words, phrases, queries, and/or sentences that have actually been spoken by individuals. In some cases, text of transcribed speech may be labeled and stored in spoken corpus 112 as items of transcribed speech such as one or more n-grams, one or more words, one or more word sequences, one or more phrases, one or more queries, one or more sentences, and so forth.

Computer system 110 may include a speech recognition component 113 configured to provide and/or support automatic speech recognition in various contexts. For example, computer system 110 may implement a web and/or cloud-based service configured to provide automatic speech recognition in support of an intelligent personal assistant, voice-enabled search app, and/or other type of conversational application executed by client device 104. In various implementations, training data collection component 111 may be configured to collect input to and/or output from speech recognition component 113 for use as training data and store such input and/or output (e.g. text of transcribed speech) in spoken corpus 112. In some cases, input to and/or output from speech recognition component 113 may be selected based on high recognition confidence and/or subsequent confirmation such as a click in the voice search domain.

Training data collection component 111 may generate a typed corpus 114 by acquiring, extracting, receiving, and/or otherwise collecting typed text from one or more of information sources 101-103. In various implementations, one or more of information sources 101-103 may store typed text such as user-generated content, web content, documents, queries, blogs, messages, posts, and/or other types of written material. For example, one or more of information sources 101-103 may be implemented by an online social networking service such as Twitter®, and training data collection component 111 may collect messages or posts generated by users of the online social networking service and store collected messages or posts in typed corpus 114. It is to be appreciated that training data collection component 111 may collect both text of transcribed speech and typed text from a particular information source that provides various types of textual material. In some cases, typed text may be labeled and stored in typed corpus 114 as items of typed text such as one or more n-grams, one or more words, one or more word sequences, one or more phrases, one or more queries, one or more sentences, and so forth.

Typed corpus 114 may provide a moderate-to-large amount of text based on words, phrases, queries, and/or sentences typed by users. Typed corpus 114 typically will include user-generated content and/or other text that contains artifacts such as typos, meaningless and/or unpronounceable letter sequences, and/or material that is unlikely to ever be uttered, which can dilute the lexicon and infest the language model.

Computer system 110 may include a filtering component 115 configured to analyze spoken corpus 112 and typed corpus 114 and to generate an unspeakable corpus 116 containing items of typed text that are predicted and/or determined to be unspeakable. In various implementations, filtering component 115 may analyze text of transcribed speech in spoken corpus 112 to determine feature vectors or other numerical representations indicative of transcribed speech. For instance, filtering component 115 may parse and/or extract items of transcribed speech (e.g., word n-grams, special phrases, queries, entire sentences, etc.) from text of transcribed speech contained in spoken corpus 112. Filtering component 115 may examine the items of transcribed speech with respect to various lexical features, syntactic feature, semantic features, pronounceability features, contextual features, and/or other features that can be used to characterize the items of transcribed speech. Exemplary features for characterizing an item (e.g., word n-gram, phrase, query, sentence, etc.) of transcribed speech may include: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features. Filtering component 115 may use one or more features to determine feature vectors representing items of transcribed speech.

Filtering component 115 may calculate and/or estimate statistical properties of individual features, combinations of features, and/or feature vectors to identify patterns, clusters, and/or behaviors that are exhibited by at least one, some, or all items of transcribed speech contained in spoken corpus 112. Filtering component 115 may express such patterns, clusters, and/or behaviors as one or more feature vectors indicative of transcribed speech. For example, an exemplary feature vector indicative of transcribed speech with respect to a certain type of item (e.g., sentence) may present a combination of features such as a particular percentage of vowels (e.g., ≥50%) and a particular average word length (e.g., 3-7 characters or letters) and/or other combinations of identified properties of transcribed speech.

Filtering component 115 may analyze typed corpus 114 to determine feature vectors representing items of typed text. For instance, filtering component 115 may parse and/or extract items of typed text (e.g., word n-grams, phrases, queries, sentences, etc.) from typed corpus 114 and may represent and/or convert each item of typed text into a feature vector with respect to one or more features (e.g., lexical features, syntactic feature, semantic features, pronounceability features, contextual features, etc.) that can be used to characterize the item of typed text. Features selected for items of typed text may correspond to various types of features expressed by one or more feature vectors derived from spoken corpus 112. For example, common features may be expressed by the feature vectors derived from spoken corpus 112 and the feature vectors representing items of typed text to facilitate similarity comparison and discrimination. Features and/or feature vectors may be determined for items of typed text at the n-gram level, word level, word sequence level, phrase level, sentence level, and so forth.

To generate unspeakable corpus 116, filtering component 115 may remove from typed corpus 114 items of typed text that are similar and/or identical items of transcribed speech. For instance, filtering component 115 may remove from typed corpus 114 items (e.g., word n-grams, phrases, queries, sentences, etc.) that are also present in spoken corpus 112 and items that are similar to items of transcribed speech contained in spoken corpus 112. Filtering of items of typed text may be performed at the n-gram level, word level, word sequence level, phrase level, sentence level, and so forth. For example, when filtering component 115 detects a word sequence in a typed sentence that is identical or similar to a spoken word and/or spoken word sequence, filtering component 115 may remove the entire type sentenced from typed corpus 114 or may remove only the word or word sequence from the typed sentence.

Filtering component 115 may remove all items from typed corpus 114 that either occurred in spoken corpus 112 directly or are represented by feature vectors identical or similar to feature vectors of one or more items in spoken corpus 112. Filtering component 115 may filter typed corpus 114 to remove items of typed text having characteristics that are similar to patterns, clusters, and/or behaviors exhibited by one or more items of transcribed speech contained in spoken corpus 112. In various implementations, filtering component 115 may generate unspeakable corpus 116 by filtering typed corpus 114 to remove each item of typed text represented by a feature vector that is within a similarity threshold of one or more feature vectors derived from spoken corpus 112 (e.g., one or more feature vectors representing items of transcribed speech and/or one or more feature vectors indicative of transcribed speech). For instance, feature vectors derived from spoken corpus 112 may be plotted as points in an N-dimensional space, and filtering may be implemented by clustering or nearest neighbor, for example, based on Euclidean distances between feature vectors representing items of typed text and feature vectors, clusters, and/or centroids of clusters derived from spoken corpus 112. An item of typed text may be removed from typed corpus 114 and excluded from unspeakable corpus 116 when represented by a feature vector that is within a similarity threshold distance of a feature vector, cluster, and/or centroid of a cluster derived from spoken corpus 112.

Any items of typed text that are not removed or filtered from typed corpus 114 may be stored in unspeakable corpus 116 by filtering component 115. In some cases, typed text may be labeled and stored in unspeakable corpus 116 as items (e.g., word n-grams, phrases, queries, sentences, etc.) of typed text that are determined to be unspeakable. When filtering has completed, unspeakable corpus 116 may be a subset of typed corpus 114 that contains only items of typed text that are predicted and/or determined to be unspeakable. For instance, unspeakable corpus 116 may store typed words, word sequences, phrases, queries, and/or sentences that are considered artifacts, are difficult to pronounce or unpronounceable, contain typographical errors or misspellings, are sequences of one-letter words, trigger autocorrect functionality, include special symbols (e.g., #, @, *, etc.) that could not be converted to lexical representation, are devoid of vowels or spaces, have improper syntax, are meaningless or unrecognizable by automatic speech recognition, and/or are otherwise dissimilar to items of transcribed speech contained in spoken corpus 112. In various implementations, typed corpus 114 may store messages posted to an online social network, and unspeakable corpus 116 may store items of typed text (e.g., word n-grams, phrases, queries, sentences, etc.) that include: a term appended to the hashtag symbol #, a username appended to the at-sign @ or composed of alphanumeric characters, an e-mail address, a uniform resource locator, and/or other sequence of characters that is most likely to be typed rather than spoken.

Items of typed text that are predicted and/or determined to be unspeakable and that are stored in and/or derived from unspeakable corpus 116 may be negative examples to be excluded from training data for language modeling. Conversely, items of transcribed speech items that have actually been spoken and that are stored in and/or derived from spoken corpus 112 may be positive examples to be included in training data for language modeling. Implementing spoken corpus 112 and unspeakable corpus 116 provides a reasonable level of separability between speakable and unspeakable training data.

Computer system 110 may include a classifier training component 117 configured to train a classifier component 118 based on training data from spoken corpus 112 and training data from unspeakable corpus 116. In various implementations, classifier training component 117 may analyze unspeakable corpus 116 to determine feature vectors representing items of typed text that are determined to be unspeakable. For instance, classifier training component 117 may parse and/or extract items (e.g., word n-grams, phrases, queries, sentences, etc.) of typed text that are determined to be unspeakable from unspeakable corpus 116 and may represent and/or convert each item of typed text into a feature vector with respect to one or more features (e.g., lexical features, syntactic feature, semantic features, pronounceability features, contextual features, etc.) that can be used to characterize the item of typed text. Exemplary features may include: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features. Features selected for items of typed text that are determined to be unspeakable may correspond to various types of features presented by feature vectors derived from spoken corpus 112 and/or derived from typed corpus 114. For example, common features may be expressed by the feature vectors derived from spoken corpus 112, the feature vectors representing items of typed text, and the feature vectors derived from unspeakable corpus 116 to facilitate similarity comparison and discrimination. Features and/or feature vectors may be determined for items of typed text that are determined to be unspeakable at the n-gram level, word level, word sequence level, phrase level, sentence level, and so forth.

Classifier training component 117 may calculate and/or estimate statistical properties of individual features, combinations of features, and/or feature vectors to identify patterns, clusters, and/or behaviors that are exhibited by at least one, some, or all items of typed text contained in unspeakable corpus 116. Classifier training component 117 may express such patterns, clusters, and/or behaviors as one or more feature vectors indicative of unspeakable text. For example, exemplary feature vectors indicative of unspeakable text may present features corresponding to one or more of: long words or character strings without vowels, sequences of one-letter words, words that trigger autocorrect functionality, the presence of various symbols (e.g., #, @, *, etc.) in words, and/or other identified properties of unspeakable text.

In various implementations, classifier training component 117 may train classifier component 118 based on features vectors derived from spoken corpus 112 (e.g., feature vectors representing items of transcribed speech and/or feature vectors indicative of transcribed speech) and feature vectors derived from unspeakable corpus 116 (e.g., feature vectors representing items of typed text that are determined to be unspeakable and/or feature vectors indicative of unspeakable text). Classifier training component 117 may employ features vectors that were derived from spoken corpus 112 by filtering component 115 and/or may itself derive featured vectors from spoken corpus 112. It can be appreciated that features vectors derived from spoken corpus 112 and feature vectors derived from unspeakable corpus 116 have discriminative power for distinguishing between speakable items of text and unspeakable items of text.

Classifier training component 117 may employ various statistical, artificial intelligence, and/or machine-learning techniques to train classifier component 118. For example, classifier training component 117 may train classifier component 118 using supervised machine learning (e.g., Support Vector Machine (SVM), linear regression, logistic regression, Naive Bayes, neural networks, decision tree, etc.) based on labeled training data from spoken corpus 112 and unspeakable corpus 116. Classifier training component 117 may hold back a subset of items from spoken corpus 112 and a subset of items from unspeakable corpus 116 to be used as validation data, train classifier component 118 based on the remaining items over one or more iterations, test classifier component 118 based on the validation data, and adjust parameters of classifier component 118. While certain exemplary training has been described, it is to be appreciated that other types of statistical, artificial intelligence, and/or machine learning techniques may be employed.

Classifier component 118 may be implemented as a linear classifier (e.g., linear SVM classifier, least squares classifier, perceptron classifier, linear regression classifier, logistic regression classifier, Naive Bayes classifier, Linear Discriminant Analysis (LDA) classifier, etc.), a nonlinear classifier (e.g., nonlinear SVM classifier, neural network classifier, etc.), a kernel classifier, a decision tree classifier, and/or other suitable type of classifier. In various implementations, classifier component 118 may employ one or more machine learning techniques (e.g., supervised, semi-supervised, unsupervised, and/or combination thereof) based on probabilistic and/or statistical-based models including, for example: generative models (e.g., Hidden Markov Model (HMM), Naive Bayes, probabilistic context free grammars, and the like), discriminative models (e.g., SVM, Conditional Random Fields (CRFs), decision trees, neural networks, linear regression, and the like), and/or a combination thereof.

Classifier component 118 may be trained to learn to discriminate between textual items contained in spoken corpus 112 and textual items contained in unspeakable corpus 116 based on statistical properties of features presented in features vectors derived from spoken corpus 112 and unspeakable corpus 116. When trained, classifier component 118 may be configured to distinguish and continue to learn to better distinguish between textual training data that is likely to be spoken and textual training data that is unspeakable. Classifier component 118 may be configured to predict how speakable a sample of training data is and/or classify a sample of training as either speakable or unspeakable based on various features (e.g., lexical features, syntactic feature, semantic features, pronounceability features, contextual features, etc.) presented in a feature vector that represents the sample of training data.

Language Model Training

In accordance with aspects of the described subject matter, computer system 110 may perform various operations involved with language modeling to support speech recognition such as language model training.

Referring to FIG. 1B, with continuing reference to FIG. 1A, computer system 110 may access and/or communicate with one or more of information sources 101-103 and/or one or more different information sources over network 105 to collect new training data. For example, training data collection component 111 may be configured to acquire, extract, receive, and/or otherwise collect new training data from one or more information sources 101-103. As mentioned above, computer system 110 and/or training data collection component 111 may employ various mechanisms in the interests of user privacy and information protection when collecting training data from information sources 101-103 and/or other information sources.

Training data collection component 111 may generate a new typed corpus 119 by acquiring, extracting, receiving, and/or otherwise collecting new and/or different typed text (e.g., user-generated content, web content, documents, queries, blogs, messages, posts, and/or other types of written material) from one or more of information sources 101-103. For example, training data collection component 111 may collect new and/or different messages or posts generated by users of an online social networking service and store collected messages or posts in new typed corpus 119. In some cases, new typed text may be labeled and stored in new typed corpus 119 as items of typed text such as one or more n-grams, one or more words, one or more word sequences, one or more phrases, one or more queries, one or more sentences, and so forth.

New typed corpus 119 may provide a moderate-to-large amount of potential training data (e.g., in-domain and/or out-of-domain training data) based on words, phrases, queries, and/or sentences typed by users but typically will include user-generated content that is unsuitable for statistical language modeling. For instance, new potential training data contained in new typed corpus 119 may include artifacts such as typos, meaningless and/or unpronounceable letter sequences, and/or material that is unlikely to ever be uttered, which can dilute the lexicon and infest the language model.

Computer system 110 may include a feature extract component 120 configured to analyze new typed corpus 119 and to determine feature vectors or other numerical representations representing items of new typed text. In various implementations, feature extraction component 120 may parse and/or extract items (e.g., word n-grams, phrases, queries, sentences, etc.) of new typed text from new typed corpus 119 and may represent and/or convert each item of new typed text into a feature vector with respect to one or more features (e.g., lexical features, syntactic feature, semantic features, pronounceability features, contextual features, etc.) that can be used to characterize the item of new typed text. Exemplary features may include: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features. Features selected for items of new typed text may correspond to various types of features presented by feature vectors derived from spoken corpus 112 and/or derived from unspeakable corpus 116. Features and/or feature vectors may be determined for items of new typed text at the n-gram level, word level, word sequence level, phrase level, sentence level, and so forth.

In various implementations, feature extraction component 120 may employ classifier component 118 to generate a speakable corpus 121 containing only items of new typed text that are predicted to be speakable. Classifier component 118, shown in FIG. 1B, may be in a trained state and configured to predict and/or identify items of new typed text that are speakable based on feature vectors representing items of new typed text. For instance, classifier component 118 may evaluate and predict whether an item of new typed text (e.g., word n-gram, phrase, query, sentence, etc.) from new typed corpus 119 should be included as training data for language modeling based on a feature vector representing the item of new typed text. Classifier component 118 may discriminate between speakable text to be included in speakable corpus 121 and unspeakable text to be excluded from speakable corpus 121. Classifier component 118 may predict whether items of new typed text are spoken, likely to be spoken, might be spoken, unlikely to be spoken, and/or never spoken utilizing various levels of granularity and statistical probabilities. Classifier component 118 may classify, label, and/or tag items of new typed text that are predicted to be speakable and/or speakable enough for inclusion within speakable corpus 121. In some cases, speakable items may include all items except those that are classified as never spoken. In other cases, items that are classified as unlikely to be spoken also may be excluded from speakable items.

To generate speakable corpus 121, feature extraction component 120 may select items (e.g., word n-grams, phrases, queries, sentences, etc.) from new typed corpus 119 that are classified as speakable and/or may exclude items in new typed corpus 119 that are classified as unspeakable. Selection and/or exclusion of items of new typed text may be performed at the n-gram level, word level, word sequence level, phrase level, sentence level, and so forth. For instance, when a new typed sentence contains a word and/or a word sequence that is classified as unspeakable, feature extraction component 120 may exclude the entire typed sentence from speakable corpus 121 or may exclude only the word or word sequence from the new typed sentence.

Any items of new typed text in new typed corpus 119 that are predicted to be speakable and/or classified as speakable may be selected and stored in speakable corpus 121 by feature extraction component 120. In some cases, new typed text may be labeled and stored in speakable corpus 121 as items (e.g., word n-grams, phrases, queries, sentences, etc.) of typed text that are determined to be speakable. When classification has completed, speakable corpus 121 may be a subset of new typed corpus 119 that contains only items of typed text that are predicted and/or determined to be speakable. For instance, speakable corpus 121 may include typed words, word sequences, phrases, queries, and/or sentences from new typed corpus 119 that present features similar and/or identical to transcribed speech. Likewise, speakable corpus 121 may exclude typed words, word sequences, phrases, queries, and/or sentences in new typed corpus 119 that are considered artifacts, are difficult to pronounce or unpronounceable, contain typographical errors or misspellings, are sequences of one-letter words, trigger autocorrect functionality, include symbols (e.g., #, @, *, etc.), are devoid of vowels or spaces, have improper syntax, are meaningless or unrecognizable by automatic speech recognition, and/or are otherwise predicted to be or classified as unspeakable. In various implementations, new typed corpus 119 may store messages posted to an online social network, and speakable corpus 121 may exclude items of new typed text (e.g., word n-grams, phrases, queries, sentences, etc.) that include: a term appended to the hashtag symbol #, a username appended to the at-sign @ or composed of alphanumeric characters, an e-mail address, a uniform resource locator, and/or other sequence of characters that is most likely to be typed rather than spoken.

Items of new typed text that are predicted and/or determined to be speakable and that are stored in and/or derived from speakable corpus 121 may be positive examples to be included in training data for language modeling. In various implementations, positive examples that are stored in and/or derived from speakable corpus 121 may supplement and/or be supplemented by positive examples that are stored in and/or derived from spoken corpus 112. It can be appreciated that implementing spoken corpus 112 and speakable corpus 121 provides a greater amount of available training data that is suitable for language modeling.

Computer system 110 may include a language model training component 122 configured to train a language model component 123 based on training data from speakable corpus 121 and/or based on training data from both spoken corpus 112 and speakable corpus 121. In various implementations, the training of language model component 123 by language model training component 122 may involve performing text normalization or tokenization, counting items (e.g., word n-grams, phrases, queries, sentences, etc.) that are observed in training data, determining frequencies of observed items, calculating and/or estimating statistical probabilities, estimating and/or adjusting language model parameters, smoothing statistical probabilities and/or language model parameters to compensate for data sparseness, and/or other operations. Language model training component 122 may employ various statistical, artificial intelligence, and/or machine-learning techniques (e.g., Maximum Likelihood Estimation, conditional probability, linear interpolation, back-off smoothing, HMM, n-gram models, neural networks, decision tree, etc.) based on training data from spoken corpus 112 and speakable corpus 121. Language model training component 122 may hold back a subset of items from spoken corpus 112 and/or a subset of items from speakable corpus 121 to be used as validation data, train language model component 123 based on the remaining items over one or more iterations, test language model component 123 based on the validation data, and adjust parameters of language model component 123. While certain exemplary training has been described, it is to be appreciated that other types of statistical, artificial intelligence, and/or machine learning techniques may be employed.

Language model component 123 may be implemented as a statistical language model such as an n-gram (e.g., unigram, bigram, trigram, 4-gram, etc.) language model, a finite state grammar language model, a context free grammar (CFG) language model, a semantic grammar language model, a link grammar model, a decision tree language model, a Maximum Entropy distribution language model, an adaptive language model, a positional language model, a dependency language model, and/or other suitable type of language model. In various implementations, language model component 123 may employ one or more machine learning techniques (e.g., supervised, semi-supervised, unsupervised, and/or combination thereof) based on probabilistic and/or statistical-based models including, for example: generative models (e.g., HMM, Naive Bayes, probabilistic context free grammars, and the like), discriminative models (e.g., SVM, CRFs, decision trees, neural networks, linear regression, and the like), and/or a combination thereof.

Language model component 123 may be trained to predict and continue to learn to better predict the likelihood of speakable and/or spoken items (e.g., word n-grams, phrases, queries, sentences, etc.). In various implementations, language model component 123 may be a statistical language model that estimates a probability distribution of various items and provides the conditional probability of an item given a history of one or more previous items. For instance, language model component 123 may be trained to estimate n-gram probabilities based on text from speakable corpus 121 and spoken corpus 112 and may supply the likelihood of a word in a word sequence given one or more previous words in the word sequence.

Language model component 123 may be implemented as a database containing information representing statistical properties of words of a language. Language model component 123 may be implemented as general purpose language model representing a comprehensive language domain such as spoken English and/or other spoken language. Language model component 123 also may be implemented as an application-specific language model or grammar that constrains speech recognition to listen for certain utterances that have semantic meaning to the application. Language modeling component 123 may be employed for various applications and/or purposes including, without limitation: speech recognition, machine translation, spelling correction, part-of-speech tagging, parsing, handwriting recognition, information retrieval, question answering, natural language processing, spoken language understanding, speech utterance classification, automated call routing, domain detection, intent determination, slot filling, data-driven methods, and/or other applications.

In various implementations, language model component 123 may be employed by speech recognition component 113 when recognizing a word sequence based on audio input from a user. Speech recognition component 113 may be implemented as a speech recognition engine configured to receive audio data and transcribe the audio data into text. For example, speech recognition component 113 may receive and transcribe audio data that is received from client device 104 over network 105. Speech recognition component 113 may process an audio stream to isolate segments of speech and generate a series of numeric values that characterize the vocal sounds in the audio stream. Speech recognition component 113 may process the series of numeric values and determine the most likely word sequence that corresponds to the audio stream.

Computer system 110 may include an acoustic model component 124 and a pronunciation model component 125 in addition to language model component 123. Acoustic model component 124 may be implemented as a database containing information that represents the acoustic sounds of a language and may be trained based on audio and transcription data to recognize characteristics of speech patterns and acoustic environments. Pronunciation model component 125 may be implemented as a database containing a lexicon that lists a large number of the words in a language and may provide information on how to pronounce each word.

In various implementations, speech recognition component 113 may access and/or retrieve values from language model component 123 (e.g., trained n-gram model), acoustic model component 124 (e.g., trained HMM), and pronunciation model component 125 (e.g., lexicon) in order to recognize a word sequence represented by acoustic features. Information from language model component 123 may be used to estimate the relative likelihood of different words and/or word sequences and may be incorporated with information from acoustic model component 124 and pronunciation model component 125 to provide context, resolve ambiguities, and/or distinguish between similar sounding words and/or word sequences. Language model component 123 may be used to predict the next word in a word sequence and/or predict a word sequence based one or more previously recognized words and may help speech recognition component 113 to accurately determine the best hypothesis when presented with similar sounding candidates.

While FIG. 1B illustrates speech recognition component 113, language model component 123, acoustic model component 124, and pronunciation model component 125 as being implemented by computer system 110, it is to be appreciated that one or more of such components and/or parts thereof may be implemented by client device 104 for performing speech recognition.

Exemplary Processes

With continuing reference to the foregoing figures, exemplary processes are described below to further illustrate aspects of the described subject matter. It is to be understood that the following exemplary process is not intended to limit the described subject matter to particular implementations.

Figure 2:
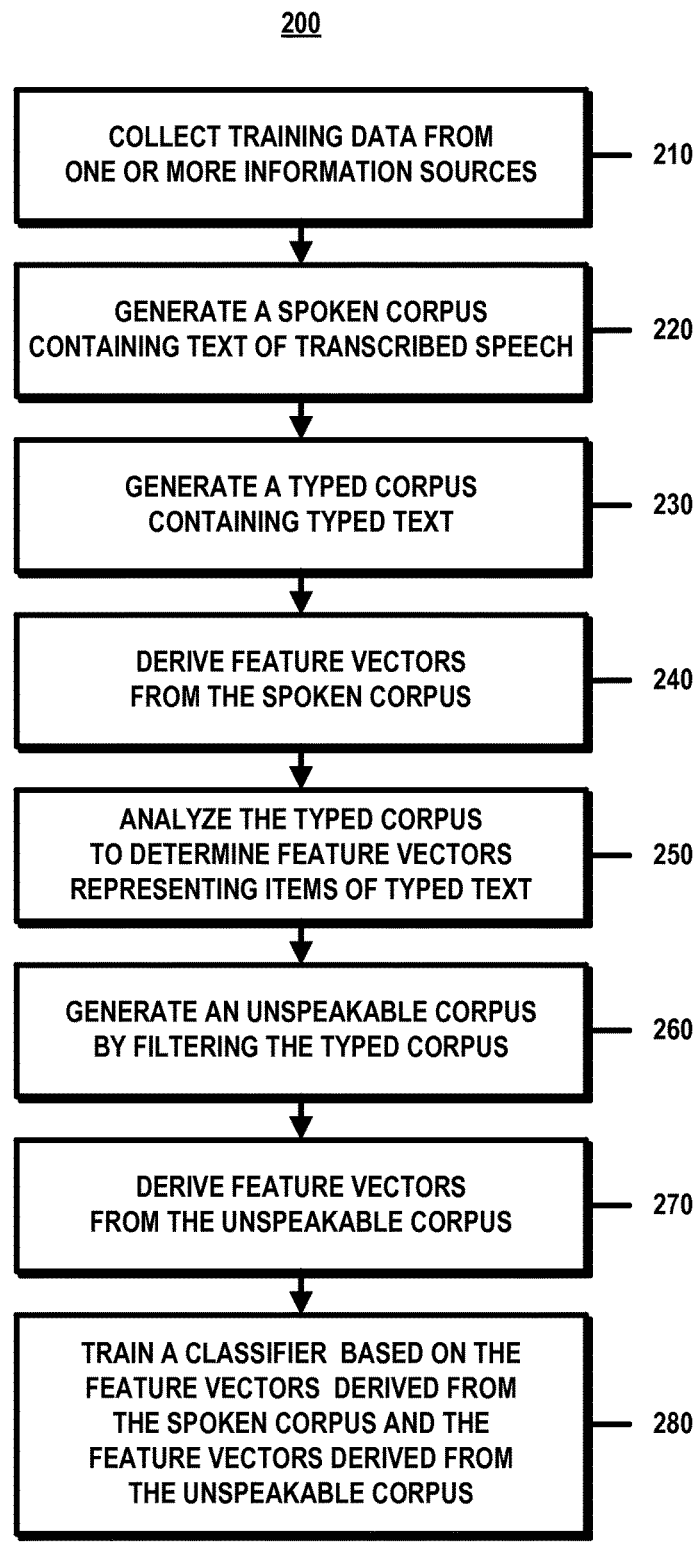
FIG. 2 illustrates an embodiment of an exemplary process in accordance with aspects of the described subject matter.

FIG. 2 illustrates a computer-implemented method 200 as an embodiment of an exemplary process in accordance with aspects of the described subject matter. In various embodiments, computer-implemented method 200 may be performed by computer system 110 and/or other suitable computer system including one or more computing devices. It is to be appreciated that computer-implemented method 200, or portions thereof, may be performed by various computing devices, computer systems, components, and/or computer-executable instructions stored on one more computer-readable storage media.

At 210, a computer system may collect training data from one or more information sources. For example, computer system 110 may communicate over network 105 and collect training data from one or more of information sources 101-103. The training data may include text of transcribed speech and typed text. Computer system 110 may include speech recognition component 113 and may collect input to and/or output from speech recognition component 113 for use as training data. The typed text may include user-generated content, web content, documents, queries, blogs, messages, posts, and/or other types of written material. For instance, computer system 110 may collect messages or posts generated by users of an online social networking service.

At 220, the computer system may generate a spoken corpus containing text of transcribed speech. For example, computer system 110 may generate spoken corpus 112 based on training data collected from one or more of information sources 101-103. Spoken corpus 112 may be configured to store textual training data based on words, phrases, queries, and/or sentences that have actually been spoken by individuals. Spoken corpus 112 may contain text of transcribed speech such as annotated trustworthy in-domain voice transcriptions, transcribed automatic speech recognition system input, automatic speech recognition system output, transcribed audio and/or video teleconferences, transcribed broadcast content, transcribed speeches, transcribed dictations, transcribed spoken search engine queries, and/or other types of automated or human transcriptions of conversational speech or audio content.

At 230, the computer system may generate a typed corpus containing typed text. For example, computer system 110 may generate typed corpus 114 based on the training data collected from one or more of information sources 101-103. Typed corpus 114 may contain typed text such as user-generated content, web content, documents, queries, blogs, messages, posts, and/or other types of written material. For instance, typed corpus 114 may store collected messages or posts generated by users of an online social networking service. Typed corpus 114 may contain user-generated content and/or other text that includes artifacts such as typos, meaningless and/or unpronounceable letter sequences, and/or other material that is unlikely to be uttered.

At 240, the computer system may derive feature vectors from the spoken corpus. For example, computer system 110 may analyze spoken corpus 112 and derive feature vectors representing items (e.g., n-grams, words, word sequences, phrases, queries, sentences, etc.) of transcribed speech and/or feature vectors indicative of transcribed speech. Computer system 110 may derive a feature vector representing an item of transcribed speech by representing and/or converting an item of transcribed speech in spoken corpus 112 into a feature vector with respect to one or more features (e.g., lexical features, syntactic feature, semantic features, pronounceability features, contextual features, etc.) that can be used to characterize the item of transcribed speech. Computer system 110 may derive a feature vector indicative of transcribed speech by calculating and/or estimating statistical properties of individual features, combinations of features, and/or feature vectors to identify patterns, clusters, and/or behaviors that are exhibited by at least one, some, or all items of transcribed speech contained in spoken corpus 112. Computer system 110 may express such patterns, clusters, and/or behaviors as one or more feature vectors indicative of transcribed speech. A feature vector derived from spoken corpus 112 may present various features such as: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features.

At 250, the computer system may analyze the typed corpus to determine feature vectors representing items of typed text. For example, computer system 110 may analyze typed corpus 114 to determine feature vectors representing items (e.g., word n-grams, phrases, queries, sentences, etc.) of typed text. Computer system 110 may represent and/or convert an item of typed text from typed corpus 114 into a feature vector with respect to one or more features (e.g., lexical features, syntactic feature, semantic features, pronounceability features, contextual features, etc.) that can be used to characterize the item of typed text. A feature vector representing an item of typed text may present various features such as: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features. Feature vectors representing items of typed text may present features that correspond to various types of features presented by feature vectors derived from spoken corpus 112. For example, common features may be expressed by the feature vectors derived from spoken corpus 112 and the feature vectors representing items of typed text to facilitate similarity comparison and discrimination.

At 260, the computer system may generate an unspeakable corpus by filtering the typed corpus. For example, computer system 110 may generate unspeakable corpus 116 by filtering typed corpus 114 to remove each item of typed text represented by a feature vector that is within a similarity threshold of one or more feature vectors derived from spoken corpus 112 (e.g., one or more feature vectors representing items of transcribed speech and/or one or more feature vectors indicative of transcribed speech). An item of typed text may be removed from typed corpus 114 and excluded from unspeakable corpus 116 when represented by a feature vector that is within a similarity threshold distance (e.g., Euclidean distance) of a feature vector, cluster, and/or centroid of a cluster derived from spoken corpus 112. Computer system 110 may filter and/or remove all items from typed corpus 114 that either occurred in spoken corpus 112 directly or are represented by feature vectors identical or similar to feature vectors derived from spoken corpus 112.

Computer system 110 may generate unspeakable corpus 116 by filtering and/or removing from typed corpus 114 items of typed text that are also present in spoken corpus 112 and items that are similar to items of transcribed speech contained in spoken corpus 112. Unspeakable corpus 116 may be a subset of typed corpus 114 that contains only items of typed text that are predicted and/or determined to be unspeakable. Unspeakable corpus 116 may store typed words, word sequences, phrases, queries, and/or sentences that are considered artifacts, are difficult to pronounce or unpronounceable, contain typographical errors or misspellings, are sequences of one-letter words, trigger autocorrect functionality, include symbols (e.g., #, @, *, etc.), are devoid of vowels or spaces, have improper syntax, are meaningless or unrecognizable by automatic speech recognition, and/or are otherwise dissimilar to items of transcribed speech contained in spoken corpus 112. Training data stored in typed corpus 114 may include messages posted to an online social network, and unspeakable corpus 116 may store items of typed text (e.g., word n-grams, phrases, queries, sentences, etc.) that include: a term appended to the hashtag symbol #, a username appended to the at-sign @ or composed of alphanumeric characters, an e-mail address, a uniform resource locator, and/or other sequence of characters that is most likely to be typed rather than spoken. Items of typed text that are determined to be unspeakable and that are stored in and/or derived from unspeakable corpus 116 may be negative examples to be excluded from training data for language modeling.

At 270, the computer system may derive feature vectors from the unspeakable corpus. For example, computer system 110 may analyze unspeakable corpus 116 and derive feature vectors representing items (e.g., word n-grams, phrases, queries, sentences, etc.) of typed text that are determined to be unspeakable and/or feature vectors indicative of unspeakable text. Computer system 110 may derive a feature vector representing an item of typed text that is determined to be unspeakable by representing and/or converting an item of typed text in unspeakable corpus 116 into a feature vector with respect to one or more features (e.g., lexical features, syntactic feature, semantic features, pronounceability features, contextual features, etc.) that can be used to characterize the item of typed text. Computer system 110 may derive a feature vector indicative of unspeakable text by calculating and/or estimating statistical properties of individual features, combinations of features, and/or feature vectors to identify patterns, clusters, and/or behaviors that are exhibited by at least one, some, or all items of typed text contained in unspeakable corpus 116. Computer system 110 may express such patterns, clusters, and/or behaviors as one or more feature vectors indicative of unspeakable text. A feature vector derived from unspeakable corpus 116 may present various features such as: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features. Features presented by feature vectors derived from unspeakable corpus 116 may correspond to various types of features presented by feature vectors derived from spoken corpus 112 and/or derived from typed corpus 114. For example, common features may be expressed by the feature vectors derived from spoken corpus 112, the feature vectors representing items of typed text, and the feature vectors derived from unspeakable corpus 116 to facilitate similarity comparison and discrimination.

At 280, the computer system may train a classifier based on the feature vectors derived from the spoken corpus and the feature vectors derived from the unspeakable corpus. For example, computer system 110 may train a classifier component 118 (e.g., linear classifier, nonlinear classifier, kernel classifier, decision tree classifier, etc.) based on features vectors derived from spoken corpus 112 (e.g., feature vectors representing items of transcribed speech and/or feature vectors indicative of transcribed speech) and feature vectors derived from unspeakable corpus 116 (e.g., feature vectors representing items of typed text that determined to be unspeakable and/or feature vectors indicative of unspeakable text). Computer system 110 may train classifier component 118 based on training data from spoken corpus 112 and training data from unspeakable corpus 116 using various statistical, artificial intelligence, and/or machine-learning techniques.

Classifier component 118 may be trained to learn to discriminate between textual items contained in spoken corpus 112 and textual items contained in unspeakable corpus 116 based on statistical properties of features presented in features vectors derived from spoken corpus 112 and unspeakable corpus 116. When trained, classifier component 118 may be configured to distinguish and continue to learn to better distinguish between textual training data is likely to be spoken and textual training data that is unspeakable. Classifier component 118 may be configured to predict how speakable a sample of training data is and/or classify a sample of training as either speakable or unspeakable based on various features (e.g., lexical features, syntactic feature, semantic features, pronounceability features, contextual features, etc.) presented in a feature vector that represents the sample of training data.

Figure 3:
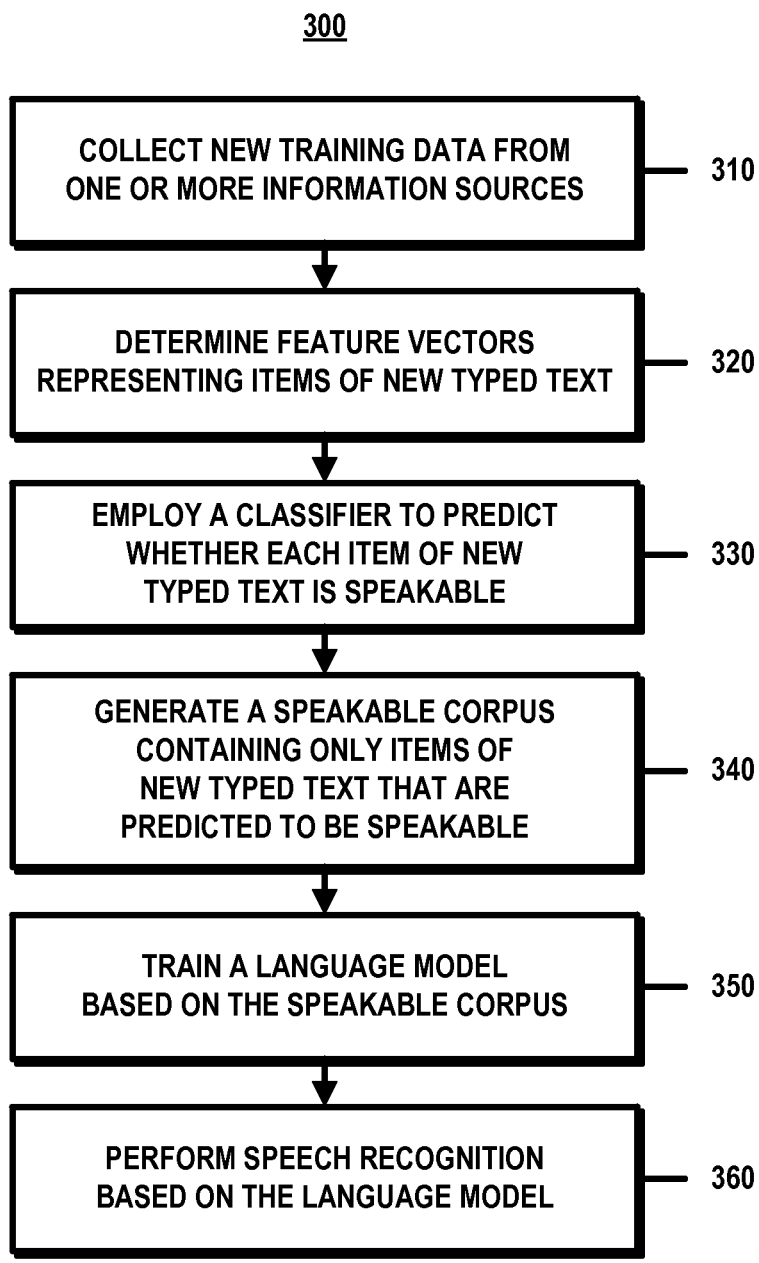
FIG. 3 illustrates an embodiment of an exemplary process in accordance with aspects of the described subject matter.

FIG. 3 illustrates a computer-implemented method 300 as an embodiment of an exemplary process in accordance with aspects of the described subject matter. In various embodiments, computer-implemented method 300 may be performed computer system 110 and/or other suitable computer system including one or more computing devices. It is to be appreciated that computer-implemented method 300, or portions thereof, may be performed by various computing devices, computer systems, components, and/or computer-executable instructions stored on one more computer-readable storage media.

At 310, a computer system may collect new typed text from one or more information sources. For example, computer system 110 may communicate over network 105 and collect new typed text from one or more of information sources 101-103 for use as training data. The new typed text may include user-generated content, web content, documents, queries, blogs, messages, posts, and/or other types of written material. For instance, computer system 110 may collect messages or posts generated by users of an online social networking service. Computer system 110 may store the new typed text in new typed corpus 119. Some items of new typed text may include artifacts such as typos, meaningless and/or unpronounceable letter sequences, and/or material that is unlikely to ever be uttered, which is unsuitable for statistical language modeling.

At 320, the computer system may determine feature vectors representing items of new typed text. For example, computer system 110 may analyze new typed corpus 119 to determine feature vectors representing items (e.g., word n-grams, phrases, queries, sentences, etc.) of new typed text. Computer system 110 may represent and/or convert an item of new typed text from new typed corpus 119 into a feature vector with respect to one or more features (e.g., lexical features, syntactic feature, semantic features, pronounceability features, contextual features, etc.) that can be used to characterize the item of new typed text. A feature vector representing an item of new typed text may present various features such as: length (e.g., number of characters or letters), average word length (e.g., value or range of values), types of characters, number of vowels, percentage of vowels, number of spaces, number of words, parts-of-speech, syntax, number of syllables, presence of named entities, frequency of common words, and/or other selected features. Feature vectors representing items of new typed text may present features that correspond to various types of features presented by feature vectors derived from spoken corpus 112 and/or derived from unspeakable corpus 116. For example, common features may be expressed by the feature vectors derived from spoken corpus 112, the feature vectors representing items of new typed text, and the feature vectors derived from unspeakable corpus 116 to facilitate similarity comparison and discrimination.

At 330, the computer system may employ a classifier to predict whether each item of new typed text is speakable. For example, computer system 110 may employ classifier component 118 (e.g., linear classifier, nonlinear classifier, kernel classifier, decision tree classifier, etc.) that is in a trained state and configured to predict and/or identify items (e.g., word n-grams, phrases, queries, sentences, etc.) of new typed text that are speakable based on feature vectors representing items of new typed text. Classifier component 118 may evaluate and predict whether an item of new typed text from new typed corpus 119 is speakable and should be included as training data for language modeling based on a feature vector representing the item of new typed text. Classifier component 118 may discriminate between speakable text to be included as training data and unspeakable text to be excluded from training data. Classifier component 118 may predict whether items of new typed text are spoken, likely to be spoken, might be spoken, unlikely to be spoken, and/or never spoken utilizing various levels of granularity and statistical probabilities. Classifier component 118 may classify, label, and/or tag items of new typed text that are predicted to be speakable and/or speakable enough to be used as training data for language modeling. In some cases, speakable items may include all items except those that are classified as never spoken. In other cases, items that are classified as unlikely to be spoken also may be excluded from speakable items.

At 340, the computer system may generate a speakable corpus containing only items of new typed text that are predicted to be speakable. For example, computer system 110 may generate speakable corpus 121 by selecting items (e.g., word n-grams, phrases, queries, sentences, etc.) from new typed corpus 119 that are classified as speakable and/or may exclude items in new typed corpus 119 that are classified as unspeakable. Speakable corpus 121 may be a subset of new typed corpus 119 that contains only items of typed text that are predicted to be speakable such as typed words, word sequences, phrases, queries, and/or sentences from new typed corpus 119 that present features similar and/or identical to transcribed speech. Speakable corpus 121 may exclude typed words, word sequences, phrases, queries, and/or sentences in new typed corpus 119 that are considered artifacts, are difficult to pronounce or unpronounceable, contain typographical errors or misspellings, are sequences of one-letter words, trigger autocorrect functionality, include symbols (e.g., #, @, *, etc.), are devoid of vowels or spaces, have improper syntax, are meaningless or unrecognizable by automatic speech recognition, and/or are otherwise predicted to be or classified as unspeakable. Items of new typed text that are predicted to be speakable and that are stored in and/or derived from speakable corpus 121 may be positive examples to be included in training data for language modeling.

At 350, the computer system may train a language model based on the speakable corpus. For example, computer system 110 may train language model component 123 (e.g., n-gram language model, finite state grammar language model, CFG language model, semantic grammar language model, link grammar model, decision tree language model, Maximum Entropy distribution language model, adaptive language model, positional language model, dependency language model, etc.) based on training data contained in speakable corpus 121. Language model component 123 also may be trained based on training data contained in spoken corpus 112. Computer system 110 may train language model component 123 using various statistical, artificial intelligence, and/or machine-learning techniques. Language model component 123 may be trained to predict the likelihood of speakable and/or spoken items (e.g., word n-grams, phrases, queries, sentences, etc.). Language model component 123 may be implemented as a statistical language model that estimates a probability distribution of various items and provide the conditional probability of an item given a history of one or more previous items.

At 360, the computer system may perform speech recognition based on the language model. For example, computer system 110 may employ language model component 123 to perform automated speech recognition on audio data. Information from language model component 123 may be used to estimate the relative likelihood of different words and/or word sequences and may be incorporated with information from acoustic model component 124 and pronunciation model component 125 to provide context, resolve ambiguities, and/or distinguish between similar sounding words and/or word sequences.

As described above, aspects of the described subject matter may provide various attendant and/or technical advantages. By way of illustration and not limitation, text of transcribed speech may be collected from various information sources 101-103 and/or speech recognition component 113 and stored in spoken corpus 112 for use as training data. Generating spoken corpus 112 containing text of transcribed speech provides trustworthy training data based on words, phrases, queries, and/or sentences that have actually been spoken by individuals. Items of transcribed speech that are stored in and/or derived from spoken corpus 112 may be positive examples to be included in training data for language modeling.

Typed text may be collected from various information sources 101-103 and stored in typed corpus 114. Deriving feature vectors from spoken corpus 112 and determining feature vectors representing items of typed text allows typed corpus 114 to be filtered to remove items of typed text that are similar and/or identical items of transcribed speech. Filtering typed corpus 114 to remove each item of typed text represented by a feature vector that is within a similarity threshold of a feature vector derived from the spoken corpus creates unspeakable corpus 116 that contains only items of typed text that are determined to be unspeakable. Items of typed text that are determined to be unspeakable and that are stored in and/or derived from unspeakable corpus 116 may be negative examples to be excluded from training data for language modeling. Implementing spoken corpus 112 and unspeakable corpus 116 provides a reasonable level of separability between speakable and unspeakable training data.

Feature vectors may be derived from unspeakable corpus 116 and used with the feature vectors derived from spoken corpus 112 to train classifier component 118. Features vectors derived from spoken corpus 112 and feature vectors derived from unspeakable corpus 116 have discriminative power for distinguishing between speakable items of text and unspeakable items of text. Training classifier component 118 based on the feature vectors derived from spoken corpus 112 and feature vectors derived from unspeakable corpus 116 allows classifier component 118 to learn to discriminate between textual training data is likely to be spoken and textual training data that is unspeakable.

New typed text may be collected from various information sources 101-103 and may include messages posted to an online social networking service and/or other typed text that includes potential training data. Feature vectors representing items of new typed text may be determined and the trained classifier component 118 may be employed to discriminatively select training data for language modeling. The classifier component 119 may predict whether each item of new typed text is speakable based on a feature vector representing the item of new typed text for creating speakable corpus 121 containing only items of new typed text that are predicted to be speakable.

Speakable corpus 121 may exclude typed words, word sequences, phrases, queries, and/or sentences that are considered artifacts, are difficult to pronounce or unpronounceable, contain typographical errors or misspellings, are sequences of one-letter words, trigger autocorrect functionality, include symbols (e.g., #, @, *, etc.), are devoid of vowels or spaces, have improper syntax, are meaningless or unrecognizable by automatic speech recognition, and/or are otherwise predicted to be or classified as unspeakable. Speakable corpus 121 provides a large amount of additional training data that can supplement the training data available in spoken corpus 112 and can be used to train language model component 123 for use in speech recognition. Providing a larger pool of in-domain and/or out-of-domain training data allows more possible word sequences to be observed and reduces the amount of processing required to compensate for data sparseness. Providing a greater amount of available training data improves the rate and accuracy at which language model component 123 learns to predict the likelihood of speakable items.

Exemplary Operating Environments

Aspects of the described subject matter may be implemented for and/or by various operating environments, computer networks, platforms, frameworks, computer architectures, and/or computing devices. Aspects of the described subject matter may be implemented by computer-executable instructions that may be executed by one or more computing devices, computer systems, and/or processors.

In its most basic configuration, a computing device and/or computer system may include at least one processing unit (e.g., single-processor units, multi-processor units, single-core units, and/or multi-core units) and memory. Depending on the exact configuration and type of computer system or computing device, the memory implemented by a computing device and/or computer system may be volatile (e.g., random access memory (RAM)), non-volatile (e.g., read-only memory (ROM), flash memory, and the like), or a combination thereof.

A computing device and/or computer system may have additional features and/or functionality. For example, a computing device and/or computer system may include hardware such as additional storage (e.g., removable and/or non-removable) including, but not limited to: solid state, magnetic, optical disk, or tape.

A computing device and/or computer system typically may include or may access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) may be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter may be implemented by computer-executable instructions stored on one or more computer-readable storage media. Computer-executable instructions may be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system may include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device may provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device may be configured to receive and respond to input in various ways depending upon implementation. Responses may be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system may include one or more communication interfaces that allow communication between and among other computing devices and/or computer systems. Communication interfaces may be used in the context of network communication between and among various computing devices and/or computer systems. Communication interfaces may allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces may be used in the context of accessing, obtaining data from, and/or cooperating with various types of resources.

Communication interfaces also may be used in the context of distributing computer-executable instructions over a network or combination of networks. For example, computer-executable instructions can be combined or distributed utilizing remote computers and storage devices. A local or terminal computer may access a remote computer or remote storage device and download a computer program or one or more parts of the computer program for execution. It also can be appreciated that the execution of computer-executable instructions may be distributed by executing some instructions at a local terminal and executing some instructions at a remote computer.

A computing device may be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device may be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device may include and/or run one or more computer programs implemented, for example, by software, firmware, hardware, logic, and/or circuitry of the computing device. Computer programs may be distributed to and/or installed on a computing device in various ways. For instance, computer programs may be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device may include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device may include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device may include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system may be implemented by a computing device, such as a server computer, or by multiple computing devices configured to implement a service in which one or more suitably-configured computing devices may perform one or more processing steps. A computer system may be implemented as a distributed computing system in which components are located on different computing devices that are connected to each other through network (e.g., wired and/or wireless) and/or other forms of direct and/or indirect connections. A computer system also may be implemented via a cloud-based architecture (e.g., public, private, or a combination thereof) in which services are delivered through shared datacenters. Some components of a computer system may be disposed within a cloud while other components are disposed outside of the cloud.

Figure 4:
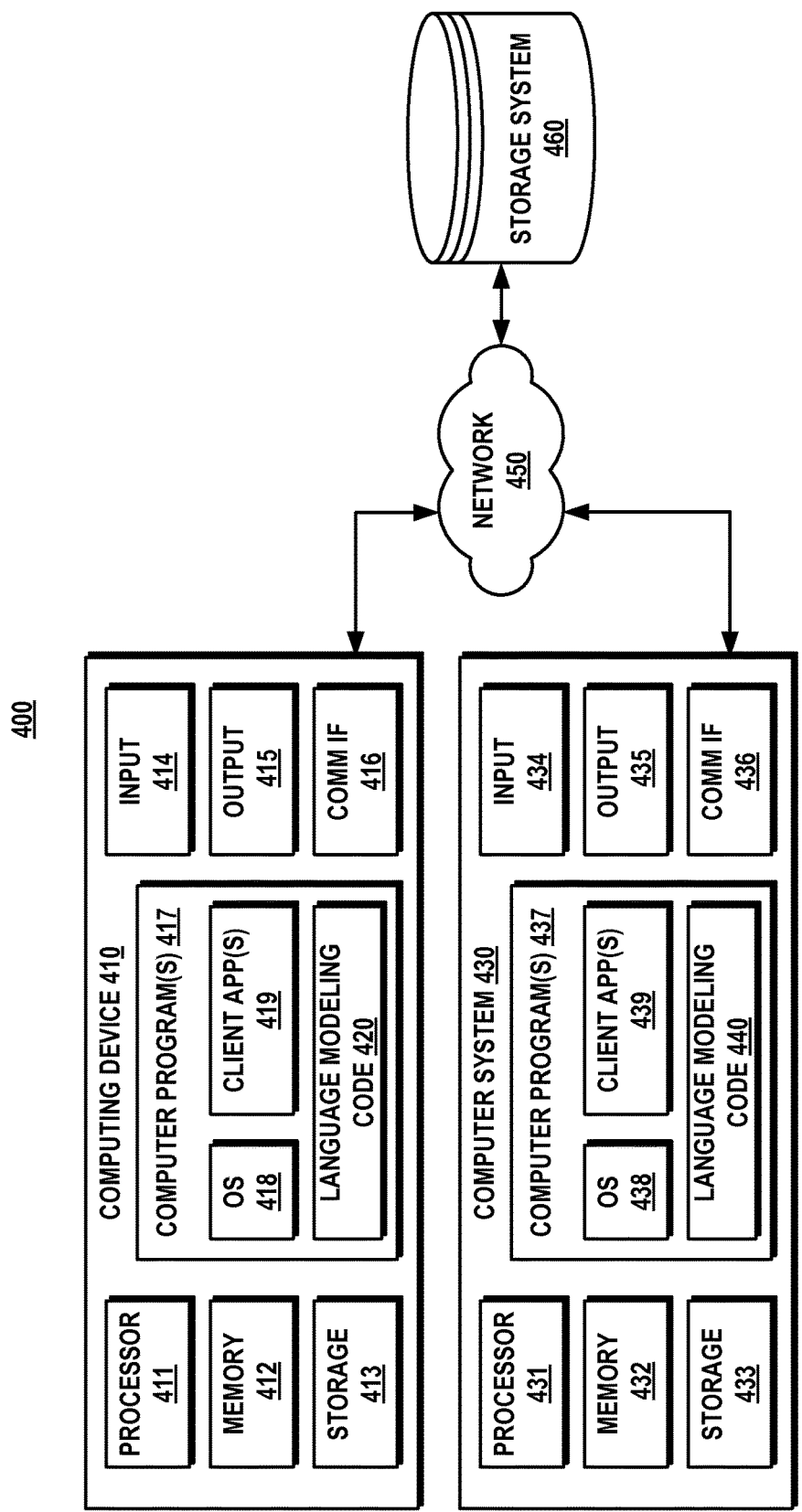
FIG. 4 illustrates an embodiment of an exemplary operating environment that may implement aspects of the described subject matter.

FIG. 4 illustrates an operating environment 400 as an embodiment of an exemplary operating environment that may implement aspects of the described subject matter. It is to be appreciated that operating environment 400 may be implemented by a client-server model and/or architecture as well as by other operating environment models and/or architectures in various embodiments.

Operating environment 400 may include a computing device 410, which may implement aspects of the described subject matter. Computing device 410 may include a processor 411 and memory 412. Computing device 410 also may include additional hardware storage 413. It is to be understood that computer-readable storage media includes memory 412 and hardware storage 413.

Computing device 410 may include input devices 414 and output devices 415. Input devices 414 may include one or more of the exemplary input devices described above and/or other type of input mechanism and/or device. Output devices 415 may include one or more of the exemplary output devices described above and/or other type of output mechanism and/or device.

Computing device 410 may contain one or more communication interfaces 416 that allow computing device 410 to communicate with other computing devices and/or computer systems. Communication interfaces 416 also may be used in the context of distributing computer-executable instructions.

Computing device 410 may include and/or run one or more computer programs 417 implemented, for example, by software, firmware, hardware, logic, and/or circuitry of computing device 410. Computer programs 417 may include an operating system 418 implemented, for example, by one or more exemplary operating systems described above and/or other type of operating system suitable for running on computing device 410. Computer programs 417 may include one or more applications 419 implemented, for example, by one or more exemplary applications described above and/or other type of application suitable for running on computing device 410.

Computer programs 417 may be configured via one or more suitable interfaces (e.g., API or other data connection) to communicate and/or cooperate with one or more resources. Examples of resources include local computing resources of computing device 410 and/or remote computing resources such as server-hosted resources, cloud-based resources, online resources, remote data stores, remote databases, remote repositories, web services, web sites, web pages, web content, and/or other types of remote resources.

Computer programs 417 may implement computer-executable instructions that are stored in computer-readable storage media such as memory 412 or hardware storage 413, for example. Computer-executable instructions implemented by computer programs 417 may be configured to work in conjunction with, support, and/or enhance one or more of operating system 418 and applications 419. Computer-executable instructions implemented by computer programs 417 also may be configured to provide one or more separate and/or stand-alone services.

Computing device 410 and/or computer programs 417 may implement and/or perform various aspects of the described subject matter. As shown, computing device 410 and/or computer programs 417 may include language modeling code 420. In various embodiments, language modeling code 420 may include computer-executable instructions that are stored on a computer-readable storage medium and configured to implement one or more aspects of the described subject matter. By way of example, and without limitation, language modeling code 420 may be implemented by computing device 410 which, in turn, may represent client device 104. By way of further example, and without limitation, language modeling code 420 may implement one or more of speech recognition component 113, language model component 123, acoustic model component 124, and pronunciation model component 125.

Operating environment 400 may include a computer system 430, which may implement aspects of the described subject matter. Computer system 430 may be implemented by one or more computing devices such as one or more server computers. Computer system 430 may include a processor 431 and memory 432. Computer system 430 also may include additional hardware storage 433. It is to be understood that computer-readable storage media includes memory 432 and hardware storage 433. Computer system 430 may include input devices 434 and output devices 435. Input devices 434 may include one or more of the exemplary input devices described above and/or other type of input mechanism and/or device. Output devices 435 may include one or more of the exemplary output devices described above and/or other type of output mechanism and/or device.

Computer system 430 may contain one or more communication interfaces 436 that allow computer system 430 to communicate with various computing devices (e.g., computing device 410) and/or other computer systems. Communication interfaces 436 also may be used in the context of distributing computer-executable instructions.

Computer system 430 may include and/or run one or more computer programs 437 implemented, for example, by software, firmware, hardware, logic, and/or circuitry of computer system 430. Computer programs 437 may include an operating system 438 implemented, for example, by one or more exemplary operating systems described above and/or other type of operating system suitable for running on computer system 430. Computer programs 437 may include one or more applications 439 implemented, for example, by one or more exemplary applications described above and/or other type of application suitable for running on computer system 430.

Computer programs 437 may be configured via one or more suitable interfaces (e.g., API or other data connection) to communicate and/or cooperate with one or more resources. Examples of resources include local computing resources of computer system 430 and/or remote computing resources such as server-hosted resources, cloud-based resources, online resources, remote data stores, remote databases, remote repositories, web services, web sites, web pages, web content, and/or other types of remote resources.

Computer programs 437 may implement computer-executable instructions that are stored in computer-readable storage media such as memory 432 or hardware storage 433, for example. Computer-executable instructions implemented by computer programs 437 may be configured to work in conjunction with, support, and/or enhance one or more of operating system 438 and applications 439. Computer-executable instructions implemented by computer programs 437 also may be configured to provide one or more separate and/or stand-alone services.

Computing system 430 and/or computer programs 437 may implement and/or perform various aspects of the described subject matter. As shown, computer system 430 and/or computer programs 437 may include language modeling code 440. In various embodiments, language modeling code 440 may include computer-executable instructions that are stored on a computer-readable storage medium and configured to implement one or more aspects of the described subject matter. By way of example, and without limitation, language modeling code 440 may be implemented by computer system 430 which, in turn, may implement computer system 110. By way of further example, and without limitation, language modeling code 440 may implement one or more aspects of computer-implemented method 200 and/or computer-implemented method 300.

Computing device 410 and computer system 430 may communicate over network 450, which may be implemented by any type of network or combination of networks suitable for providing communication between computing device 410 and computer system 430. Network 450 may include, for example and without limitation: a WAN such as the Internet, a LAN, a telephone network, a private network, a public network, a packet network, a circuit-switched network, a wired network, and/or a wireless network. Computing device 410 and computer system 430 may communicate over network 450 using various communication protocols and/or data types. One or more communication interfaces 416 of computing device 410 and one or more communication interfaces 436 of computer system 430 may by employed in the context of communicating over network 450.

Computing device 410 and/or computer system 430 may communicate with a storage system 460 over network 450. Alternatively or additionally, storage system 460 may be integrated with computing device 410 and/or computer system 430. Storage system 460 may be representative of various types of storage in accordance with the described subject matter. For example, storage system 460 may implement and/or be implemented by one or more of: information sources 101-103, spoken corpus 112, typed corpus 114, unspeakable corpus 116, new typed corpus 119, speakable corpus 121, language model component 123, acoustic model component 124, pronunciation model component 125, and/or other data storage facility in accordance with the described subject matter. Storage system 460 may provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 460 may be implemented by one or more computing devices, such as a computer cluster in a datacenter, by virtual machines, and/or provided as a cloud-based storage service.

Figure 5:
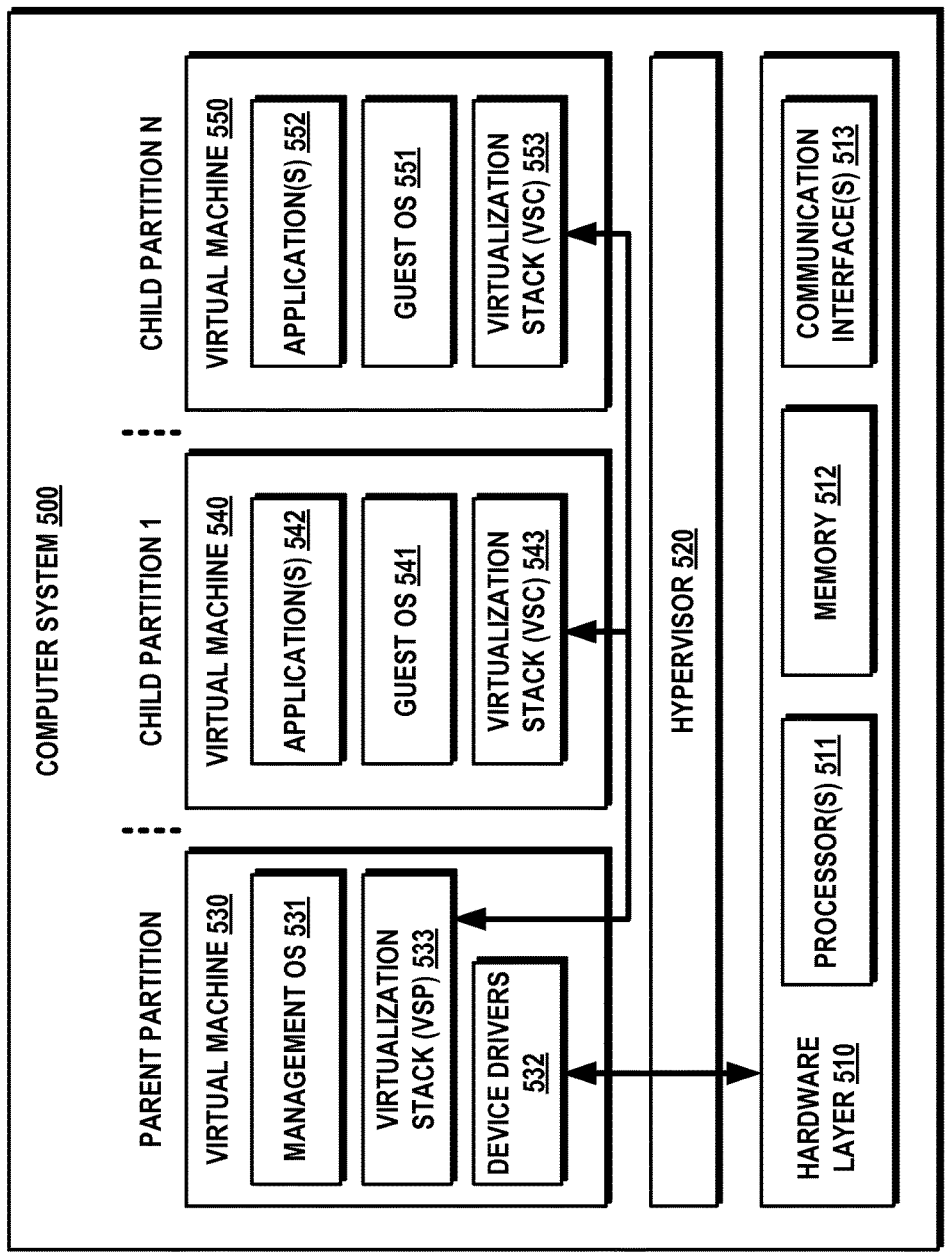
FIG. 5 illustrates an embodiment of an exemplary computer system that may implement aspects of the described subject matter.

FIG. 5 illustrates a computer system 500 as an embodiment of an exemplary computer system that may implement aspects of the described subject matter. In various implementations, deployment of computer system 500 and/or multiple deployments thereof may provide server virtualization for concurrently running multiple virtual servers instances on one physical host server computer and/or network virtualization for concurrently running multiple virtual network infrastructures on the same physical network.

Computer system 500 may be implemented by various computing devices such as one or more physical server computers that provide a hardware layer 510 which may include processor(s) 511, memory 512, and communication interface(s) 513. Computer system 500 may implement a hypervisor 520 configured to manage, control, and/or arbitrate access to hardware layer 510. In various implementations, hypervisor 520 may manage hardware resources to provide isolated execution environments or partitions such a parent (root) partition and one or more child partitions. A parent partition may operate to create one or more child partitions. Each partition may be implemented as an abstract container or logical unit for isolating processor and memory resources managed by hypervisor 520 and may be allocated a set of hardware resources and virtual resources. A logical system may map to a partition, and logical devices may map to virtual devices within the partition.

Parent and child partitions may implement virtual machines such as virtual machines 530, 540, and 550, for example. Each virtual machine may emulate a physical computing device or computer system as a software implementation that executes programs like a physical machine. Each virtual machine can have one or more virtual processors and may provide a virtual system platform for executing an operating system (e.g., a Microsoft® operating system, a Google® operating system, an operating system from Apple®, a Linux® operating system, an open source operating system, etc.). As shown, virtual machine 530 in parent partition may run a management operating system 531, and virtual machines 540, 550 in child partitions may host guest operating systems 541, 551 each implemented, for example, as a full-featured operating system or a special-purpose kernel. Each of guest operating systems 541, 551 can schedule threads to execute on one or more virtual processors and effectuate instances of application(s) 542, 552, respectively.

Virtual machine 530 in parent partition may have access to hardware layer 510 via device drivers 532 and/or other suitable interfaces. Virtual machines 540, 550 in child partitions, however, generally do not have access to hardware layer 510. Rather, such virtual machines 540, 550 are presented with a virtual view of hardware resources and are supported by virtualization services provided by virtual machine 530 in parent partition. Virtual machine 530 in parent partition may host a virtualization stack 533 that provides virtualization management functionality including access to hardware layer 510 via device drivers 532. Virtualization stack 533 may implement and/or operate as a virtualization services provider (VSP) to handle requests from and provide various virtualization services to a virtualization service client (VSC) implemented by one or more virtualization stacks 543, 553 in virtual machines 540, 550 that are operating in child partitions.

Computer system 500 may implement and/or perform various aspects of the described subject matter. By way of example, and without limitation, one or more virtual machines 540, 550 may implement language modeling functionality. By way of further example, and without limitation, one or more virtual machines 540, 550 may implement one or more aspects of computer system 110, computer-implemented method 200, and/or computer-implemented method 300. In addition, hardware layer 510 may be implemented by one or more computing devices of computer system 110 and/or computer system 430.

Figure 6:
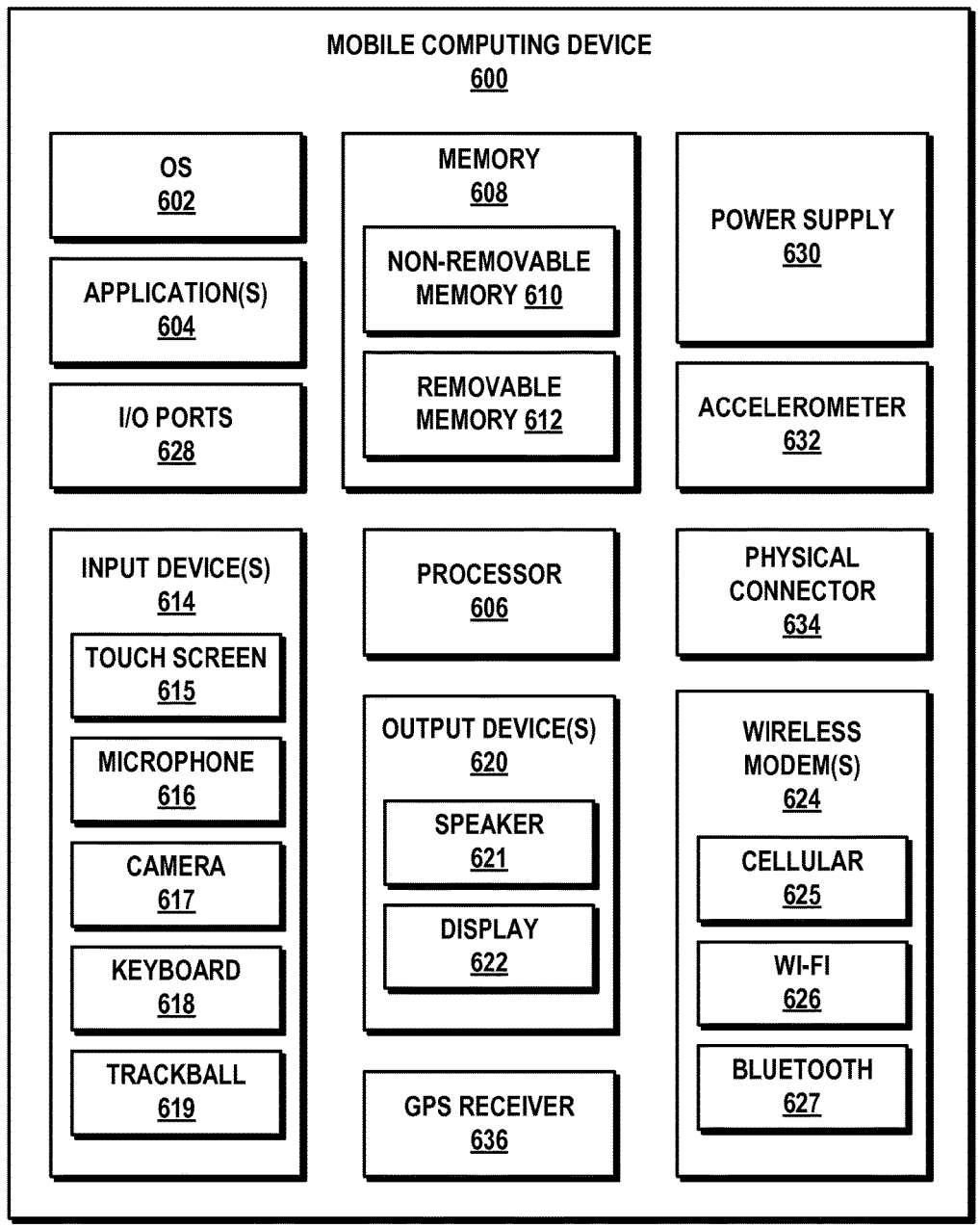
FIG. 6 illustrates an embodiment of an exemplary mobile computing device that may implement aspects of the described subject matter.

FIG. 6 illustrates a mobile computing device 600 as an embodiment of an exemplary mobile computing device that may implement aspects of the described subject matter. In various implementations, mobile computing device 600 may be an example of one or more of: client device 104 and/or computing device 410.

As shown, mobile computing device 600 includes a variety of hardware and software components that may communicate with each other. Mobile computing device 600 may represent any of the various types of mobile computing device described herein and can allow wireless two-way communication over a network, such as one or more mobile communications networks (e.g., cellular and/or satellite network), a LAN, and/or a WAN.

Mobile computing device 600 can include an operating system 602 and various types of mobile application(s) 604. In some implementations, mobile application(s) 604 may include one or more client application(s) and/or components of language modeling code 420 (e.g., speech recognition component 113, language model component 123, acoustic model component 124, pronunciation model component 125, etc.).

Mobile computing device 600 can include a processor 606 (e.g., signal processor, microprocessor, ASIC, or other control and processing logic circuitry) for performing tasks such as: signal coding, data processing, input/output processing, power control, and/or other functions.

Mobile computing device 600 can include memory 608 implemented as non-removable memory 610 and/or removable memory 612. Non-removable memory 610 can include RAM, ROM, flash memory, a hard disk, or other memory device. Removable memory 612 can include flash memory, a Subscriber Identity Module (SIM) card, a "smart card" and/or other memory device.

Memory 608 can be used for storing data and/or code for running operating system 602 and/or mobile application(s) 604. Example data can include web pages, text, images, sound files, video data, or other data to be sent to and/or received from one or more network servers or other devices via one or more wired and/or wireless networks. Memory 608 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 600 can include and/or support one or more input device(s) 614, such as a touch screen 615, a microphone 616, a camera 617, a keyboard 618, a trackball 619, and other types of input devices (e.g., NUI device and the like). Touch screen 615 may be implemented, for example, using a capacitive touch screen and/or optical sensors to detect touch input. Mobile computing device 600 can include and/or support one or more output device(s) 620, such as a speaker 621, a display 622, and/or other types of output devices (e.g., piezoelectric or other haptic output devices). In some implementations, touch screen 615 and display 622 can be combined in a single input/output device.

Mobile computing device 600 can include wireless modem(s) 624 that can be coupled to antenna(s) (not shown) and can support two-way communications between processor 606 and external devices. Wireless modem(s) 624 can include a cellular modem 625 for communicating with a mobile communication network and/or other radio-based modems such as Wi-Fi modem 626 and/or Bluetooth modem 627. Typically, at least one of wireless modem(s) 624 is configured for: communication with one or more cellular networks, such as a GSM network for data and voice communications within a single cellular network; communication between cellular networks; or communication between mobile computing device 700 and a public switched telephone network (PSTN).

Mobile computing device 600 can further include at least one input/output port 628, a power supply 630, an accelerometer 632, a physical connector 634 (e.g., a USB port, IEEE 1394 (FireWire) port, RS-232 port, and the like), and/or a Global Positioning System (GPS) receiver 636 or other type of a satellite navigation system receiver. It can be appreciated the illustrated components of mobile computing device 600 are not required or all-inclusive, as various components can be omitted and other components can be included in various embodiments.

In various implementations, components of mobile computing device 600 may be configured to perform various operations described in connection with client device 104. Computer-executable instructions for performing such operations may be stored in a computer-readable storage medium, such as memory 608 for instance, and may be executed by processor 606.

Figure 7:
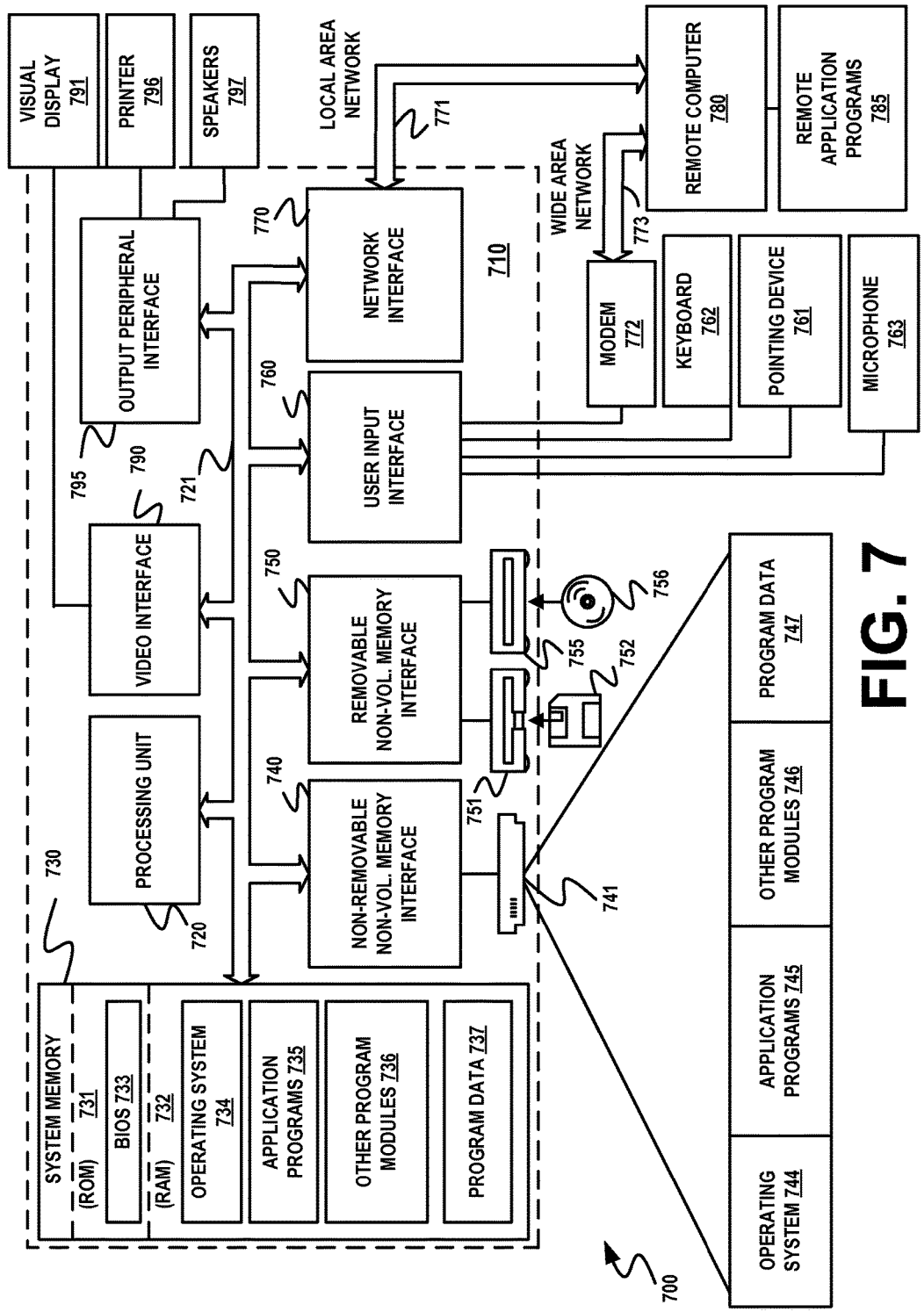
FIG. 7 illustrates an embodiment of an exemplary computing environment that may implement aspects of the described subject matter.

FIG. 7 illustrates a computing environment 700 as an embodiment of an exemplary computing environment that may implement aspects of the described subject matter. As shown, computing environment 700 includes a general-purpose computing device in the form of a computer 710. In various implementations, computer 710 may be an example of one or more of: client device 104, a computing device of computer system 110, computing device 410, a computing device of computer system 430, a computing device of computer system 500, and/or mobile computing device 600.

Computer 710 may include various components that include, but are not limited to: a processing unit 720 (e.g., one or processors or type of processing unit), a system memory 730, and a system bus 721 that couples various system components including the system memory 730 to processing unit 720.

System bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System memory 730 includes computer storage media in the form of volatile and/or nonvolatile memory such as ROM 731 and RAM 732. A basic input/output system (BIOS) 733, containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, an operating system 734, application programs 735, other program modules 736, and program data 737 are shown.

Computer 710 may also include other removable/non-removable and/or volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 741 is typically connected to system bus 721 through a non-removable memory interface such as interface 740, and magnetic disk drive 751 and optical disk drive 755 are typically connected to system bus 721 by a removable memory interface, such as interface 750.

Alternatively, or in addition, the functionality described herein can be performed, at least in part, by one or more hardware logic components. For example, and without limitation, illustrative types of hardware logic components that can be used include FPGAs, PASIC/ASICs, PSSP/ASSPs, a SoC, and CPLDs, for example.

The drives and their associated computer storage media discussed above and illustrated in FIG. 7, provide storage of computer readable instructions, data structures, program modules and other data for the computer 710. For example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762, a microphone 763, and a pointing device 761, such as a mouse, trackball or touch pad. Other input devices (not shown) may include a touch screen joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB).

A visual display 791 or other type of display device is also connected to the system bus 721 via an interface, such as a video interface 790. In addition to the monitor, computers may also include other peripheral output devices such as speakers 797 and printer 796, which may be connected through an output peripheral interface 795.

Computer 710 is operated in a networked environment using logical connections to one or more remote computers, such as a remote computer 780. Remote computer 780 may be a personal computer, a hand-held device, a server, a router, a network PC, a peer device or other common network node, and typically includes many or all of the elements described above relative to the computer 710. The logical connections depicted include a local area network (LAN) 771 and a wide area network (WAN) 773, but may also include other networks. Such networking environments are commonplace in offices, enterprise-wide computer networks, intranets and the Internet.

When used in a LAN networking environment, computer 710 is connected to LAN 771 through a network interface or adapter 770. When used in a WAN networking environment, computer 710 typically includes a modem 772 or other means for establishing communications over the WAN 773, such as the Internet. Modem 772, which may be internal or external, may be connected to system bus 721 via user input interface 760, or other appropriate mechanism. In a networked environment, program modules depicted relative to computer 710, or portions thereof, may be stored in a remote memory storage device. By way of example, and not limitation, remote application programs 785 as shown as residing on remote computer 780. It will be appreciated that the network connections shown are exemplary and other means of establishing a communications link between the computers may be used.

Supported Aspects

The detailed description provided above in connection with the appended drawings explicitly describes and supports various aspects in accordance with the described subject matter. By way of illustration and not limitation, supported aspects include a computer system for language modeling, the computer system comprising: a processor configured to execute computer-executable instructions; and memory storing computer-executable instructions configured to: collect training data from one or more information sources; generate a spoken corpus containing text of transcribed speech; generate a typed corpus containing typed text; derive feature vectors from the spoken corpus; analyze the typed corpus to determine feature vectors representing items of typed text; generate an unspeakable corpus by filtering the typed corpus to remove each item of typed text represented by a feature vector that is within a similarity threshold of a feature vector derived from the spoken corpus; derive feature vectors from the unspeakable corpus; and train a classifier based on the feature vectors derived from the spoken corpus and the feature vectors derived from the unspeakable corpus.

Supported aspects include the forgoing computing system, wherein common features are expressed by the feature vectors derived from the spoken corpus, the feature vectors representing items of typed text, and the feature vectors derived from the unspeakable corpus.

Supported aspects include any of the foregoing computing systems, wherein the typed corpus contains typed text generated by users of a social networking service.

Supported aspects include any of the forgoing computing systems, wherein the feature vector derived from the spoken corpus presents features including item length and percentage of vowels.

Supported aspects include any of the forgoing computing systems, wherein the classifier is trained to predict whether an item of text is speakable enough to be used as training data for language modeling.

Supported aspects include any of the forgoing computing systems, wherein the memory further stores computer-executable instructions configured to: collect new typed text from one or more of the information sources; determine feature vectors representing items of new typed text; employ the classifier to predict whether each item of new typed text is speakable based on a feature vector representing the item of new typed text; generate a speakable corpus containing only items of new typed text that are predicted to be speakable; and train a language model based on the speakable corpus.

Supported aspects include any of the forgoing computing systems, wherein the memory further stores computer-executable instructions configured to: train the language model based on the spoken corpus.

Supported aspects include any of the forgoing computing systems, wherein the language model is a statistical language model for determining a conditional probability of an item given one or more previous items.

Supported aspects include any of the forgoing computing systems, wherein the memory further stores computer-executable instructions configured to: perform speech recognition based on the language model.

Supported aspects further include an apparatus, a computer-readable storage medium, a computer-implemented method, and/or means for implementing any of the foregoing computer systems or portions thereof.

Supported aspects include a computer-implemented method for language modeling performed by a computer system including one or more computing devices, the computer-implemented method comprising: collecting training data from one or more information sources; generating a spoken corpus containing text of transcribed speech; generating a typed corpus containing typed text; deriving feature vectors from the spoken corpus; generating an unspeakable corpus by filtering the typed corpus to remove each item of typed text that is within a similarity threshold of one or more items in the spoken corpus; deriving feature vectors from the unspeakable corpus; and training a classifier based on the feature vectors derived from the spoken corpus and the feature vectors derived from the unspeakable corpus.

Supported aspects include the forgoing computer-implemented method, wherein the unspeakable corpus is generated by filtering the typed corpus to remove each item of typed text represented by a feature vector that is within a threshold distance of a feature vector derived from the spoken corpus.

Supported aspects include any of the forgoing computer-implemented methods, wherein common features are expressed by the feature vectors derived from the spoken corpus, feature vectors representing items of typed text, and the feature vectors derived from the unspeakable corpus.

Supported aspects include any of the forgoing computer-implemented methods, wherein the typed corpus contains typed text generated by users of a social networking service.

Supported aspects include any of the forgoing computer-implemented methods, further comprising: collecting new typed text from one or more of the information sources; determining a feature vector representing an item of new typed text; and employing the classifier to predict whether the item of new typed text is speakable based on the feature vector representing the item of new typed text.

Supported aspects include any of the forgoing computer-implemented methods, further comprising: generating a speakable corpus containing only items of new typed text that are predicted to be speakable; and training a language model based on the speakable corpus.

Supported aspects include any of the forgoing computer-implemented methods, further comprising training the language model based on the spoken corpus.

Supported aspects include any of the forgoing computer-implemented methods, further comprising performing speech recognition based on the language model.

Supported aspects further include a system, an apparatus, a computer-readable storage medium, and/or means for implementing and/or performing any of the foregoing computer-implemented methods or portions thereof.

Supported aspects include a computer-readable storage medium storing computer-executable instructions that, when executed by a computing device, cause the computing device to implement: a training data collection component configured to generate a spoken corpus containing text of transcribed speech and a typed corpus containing typed text; a filtering component configured to generate an unspeakable corpus by filtering the typed corpus to remove each item of typed text represented by a feature vector that is within a similarity threshold of a feature vector derived from the spoken corpus; and a classifier training component configured to train a classifier based on feature vectors derived from the spoken corpus and feature vectors derived from the unspeakable corpus.

Supported aspects include the forgoing computer-readable storage medium, further storing computer-executable instructions that, when executed by a computing device, cause the computing device to implement: a feature extraction component configured to determine feature vectors representing items of new typed text and employ the classifier to predict whether each item of new typed text is speakable based on a feature vector representing the item of new typed text.

Supported aspects include any of the forgoing computer-readable storage media, further storing computer-executable instructions that, when executed by a computing device, cause the computing device to implement: a language model training component configured to train a language model based on a speakable corpus containing only items of new typed text that are predicted to be speakable.

Supported aspects may provide various attendant and/or technical advantages in terms of improved efficiency and/or savings with respect to power consumption, memory, processor cycles, and/or other computationally-expensive resources.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computer system for language modeling, the computer system comprising:
   a processor configured to execute computer-executable instructions; and
   memory storing computer-executable instructions configured to:
   collect training data from one or more information sources;
   generate a spoken corpus containing text of transcribed speech;
   generate a typed corpus containing typed text;
   derive feature vectors from the spoken corpus;
   analyze the typed corpus to determine feature vectors representing items of typed text;
   generate an unspeakable corpus by filtering the typed corpus to remove each item of typed text represented by a feature vector that is within a similarity threshold of a feature vector derived from the spoken corpus;
   derive feature vectors from the unspeakable corpus;
   train a classifier based on the feature vectors derived from the spoken corpus and the feature vectors derived from the unspeakable corpus;
   generate, using the classifier, a new corpus based on new typed text from one or more of the information sources;
   train a language model using the new corpus; and
   perform speech recognition on audio data using the language model.

2. The computer system of claim 1, wherein common features are expressed by the feature vectors derived from the spoken corpus, the feature vectors representing items of typed text, and the feature vectors derived from the unspeakable corpus.

3. The computer system of claim 1, wherein the typed corpus contains typed text generated by users of a social networking service.

4. The computer system of claim 1, wherein the feature vector derived from the spoken corpus presents features including item length and percentage of vowels.

5. The computer system of claim 1, wherein the classifier is trained to predict whether an item of text is speakable enough to be used as training data for language modeling.

6. The computer system of claim 1, wherein generating the new corpus comprises:
   collecting the new typed text from one or more of the information sources;
   determining feature vectors representing items of the new typed text;
   employing the classifier to predict whether each item of the new typed text is speakable based on a feature vector representing the item of the new typed text; and
   generating the new corpus with items of the new typed text that are predicted to be speakable.

7. The computer system of claim 1, wherein the language model is trained using the spoken corpus.

8. The computer system of claim 1, wherein the language model is a statistical language model for determining a conditional probability of an item given one or more previous items.

9. The computer system of claim 1, wherein the feature vectors of the unspeakable corpus provide a negative example when training the classifier.

10. A computer-implemented method for language modeling performed by a computer system including one or more computing devices, the computer implemented method comprising:
    collecting training data from one or more information sources;
    generating a spoken corpus containing text of transcribed speech;
    generating a typed corpus containing typed text;
    deriving feature vectors from the spoken corpus;
    generating an unspeakable corpus by filtering the typed corpus to remove each item of typed text that is within a similarity threshold of one or more items in the spoken corpus;
    deriving feature vectors from the unspeakable corpus;
    training a classifier based on the feature vectors derived from the spoken corpus and the feature vectors derived from the unspeakable corpus;
    generating, using the classifier, a new corpus based on new typed text from one or more of the information sources;
    training a language model using the new corpus;
    performing speech recognition on audio data using the language model.

11. The computer-implemented method of claim 10, wherein the unspeakable corpus is generated by filtering the typed corpus to remove each item of typed text represented by a feature vector that is within a threshold distance of a feature vector derived from the spoken corpus.

12. The computer-implemented method of claim 11, wherein common features are expressed by the feature vectors derived from the spoken corpus, feature vectors representing items of typed text, and the feature vectors derived from the unspeakable corpus.

13. The computer-implemented method of claim 10, wherein the typed corpus contains typed text generated by users of a social networking service.

14. The computer-implemented method of claim 10, wherein generating the new corpus comprises:
    collecting the new typed text from one or more of the information sources;
    determining a feature vector representing an item of the new typed text; and
    employing the classifier to predict whether each item of the new typed text is speakable based on the feature vector representing the item of the new typed text.

15. The computer-implemented method of claim 10, wherein the language model is a statistical language model for determining a conditional probability of an item given one or more previous items.

16. The computer-implemented method of claim 10, further comprising training the language model based on the spoken corpus.

17. The computer-implemented method of claim 10, wherein the feature vectors of the unspeakable corpus provide a negative example when training the classifier.

18. A computer-readable storage medium storing computer-executable instructions that, when executed by a computing device, cause the computing device to implement:
    a training data collection component configured to generate a spoken corpus containing text of transcribed speech and a typed corpus containing typed text;
    a filtering component configured to generate an unspeakable corpus by filtering the typed corpus to remove each item of typed text represented by a feature vector that is within a similarity threshold of a feature vector derived from the spoken corpus;
    a classifier training component configured to train a classifier based on feature vectors derived from the spoken corpus and feature vectors derived from the unspeakable corpus; and
    a speech recognition component configured to recognize speech from audio data input using a language model trained based on one or more corpuses.

19. The computer-readable storage medium of claim 18, further storing computer-executable instructions that, when executed by a computing device, cause the computing device to implement:
    a feature extraction component configured to determine feature vectors representing items of new typed text and employ the classifier to predict whether each item of new typed text is speakable based on a feature vector representing the item of new typed text.

20. The computer-readable storage medium of claim 19, further storing computer executable instructions that, when executed by a computing device, cause the computing device to implement:
    a language model training component configured to train a language model based on a speakable corpus containing only items of new typed text that are predicted to be speakable.

* * * * *